United States Patent [19]
Nagata et al.
[11] Patent Number: 5,032,867
[45] Date of Patent: Jul. 16, 1991

[54] ORIGINAL SIZE DETECTING APPARATUS OF AN IMAGE FORMING APPARATUS

[75] Inventors: Kenzo Nagata; Keiji Kusumoto; Toshikazu Kawaguchi, all of Osaka, Japan

[73] Assignee: Minolta Camera Kabushiki Kaisha, Osaka, Japan

[21] Appl. No.: 341,788

[22] Filed: Apr. 21, 1989

[30] Foreign Application Priority Data

Apr. 22, 1988 [JP] Japan ................................ 63-101171
Jun. 1, 1988 [JP] Japan ................................ 63-136280

[51] Int. Cl.[5] ....................... G03B 27/52; G03G 15/00
[52] U.S. Cl. ......................................... 355/68; 355/69; 355/75; 355/311
[58] Field of Search ................... 355/69, 75, 233, 311, 355/68, 243

[56] References Cited

U.S. PATENT DOCUMENTS 4,568,181 2/1986 Nishiyama ............................ 355/75
4,695,154 9/1987 Watanabe ........................ 355/243 X
4,796,060 1/1989 Mizude ................................. 355/69
4,827,283 5/1989 Yamamoto et al. ................ 355/233

FOREIGN PATENT DOCUMENTS 60-4974 2/1985 Japan .

*Primary Examiner*—L. T. Hix
*Assistant Examiner*—D. Rutledge
*Attorney, Agent, or Firm*—Burns, Doane, Swecker & Mathis

[57] ABSTRACT

A scanner starts to move for preliminary scanning and an exposure lamp of the scanner turns on after a prescribed period after the start of the movement of the scanner. When a rear edge of an original of the minimum size placed on a platen is irradiated by the scanning, an amount of irradiation of the exposure lamp attains a prescribed amount since the prescribed period has passed from the turn-on thereof. Accordingly, insufficiency of an irradiation amount of the exposure lamp does not occur at the time of original size detecting operation. Thus, detection operation is speeded up and the first copy speed of the image forming apparatus is improved.

18 Claims, 28 Drawing Sheets

ORIGINAL SIZE DETECTING APPARATUS OF AN IMAGE FORMING APPARATUS

BACKGROUND OF THE INVENTION

1. Field of the Invention

The present invention relates to an image forming apparatus having an original size detecting apparatus for detecting a size (a length) of an original placed on a document platen.

2. Description of the Related Art

A conventional image forming apparatus such as a copying machine or an image reader is provided with an original size detecting apparatus for automatically detecting a size of an original placed on a document platen. Copy paper of a suitable size is selected according to the detected original size, while the lens is moved according to a copying magnification which depends on the original size detected.

The conventional original size detecting apparatus comprises a photosensor for receiving light reflected from an original and outputted according to intensity of the light, a comparator for comparing the output signal of the photosensor with a specified reference value independent of the original size and outputting a signal indicating presence or absence of the original, whereby the original size is determined when the signal is outputted from the comparator (as indicated in Japanese Patent Publication No. 4974/1985).

However, there are various densities and patterns of originals and intensity of light from an original varies considerably dependent on the density or pattern. For this reason, it is very difficult to set a reference value for determining presence or absence of various originals. In addition, it may happen that the intensity of the reflected light exceeds the reference value in spite of the presence of the original to output a signal indicating absence of an original, and thus it is difficult to detect presence or absence of an original reliably.

Consequently, in the above described conventional original size detecting apparatus, it may happen that the length of an original is determined to be shorter than the actual length, that is, the original size is determined to be smaller than the actual size.

In the above described conventional original size detecting apparatus, the size of the original is determined when a signal indicating absence of an original is outputted from the comparator. Accordingly, the detection operation cannot be started before the exposure lamp for irradiating the original emits a prescribed amount of light stably.

As a result, the detection operation is delayed by a rise time of the exposure lamp causing a decrease in a rising speed (a first copy speed) of the copying apparatus.

Thus, since it is necessary to wait until the amount of light reaches the prescribed value and is applied stably after the turn-on of the light source, the temperature on the document platen increases considerably due to the heat emitted from the light source and particularly the increase of the temperature near the top end of the document platen at the home position (the waiting position) of the light source becomes a problem.

Since the document platen is the portion which the operator touches directly, it is necessary to suppress the temperature to a value lower than a prescribed value for safety. Accordingly, there are difficulties in setting of a capacitor of a cooling fan, setting of a temperature and the like in the image forming apparatus.

In addition, since the irradiating time of the light source is long, there is a large consumption of power as a matter of course.

SUMMARY OF THE INVENTION

An object of the present invention is to speed up detection operation in an original size detecting apparatus of an image forming apparatus.

Another object of the present invention is to speed up detection operation in an original size detecting apparatus of an image forming apparatus, thereby contributing to increase of a rising speed (a first copy speed) of the image forming apparatus.

A further object of the present invention is to suppress increase of a temperature of a document platen due to irradiation heat from a light source used for detection operation in an original size detecting apparatus of an image forming apparatus.

A further object of the present invention is to suppress a temperature rise on a document platen due to irradiation heat from a light source used for detection operation and to speed up the detection operation in an original size detecting apparatus of an image forming apparatus.

A still further object of the present invention is to reduce power consumption caused by a light source used for detection operation in an original size detecting apparatus of an image forming apparatus.

In order to attain the above described objects, an original size detecting apparatus according to the present invention includes generally a platen, irradiation instructing means, irradiating means, detecting means, executing means, moving amount measuring means, determining means, and control means. An original is placed on the platen. The irradiation instructing means instructs a start of irradiation. The irradiating means starts to irradiate the platen on which the original is placed, in response to an instruction output of the irradiation instructing means and an amount of irradiation reaches a prescribed value after an elapse of a prescribed time. The detecting means receives the light reflected from the platen irradiated by the irradiating means by the prescribed amount of irradiation and detects a change in the intensity of the received light. The executing means executes a relative movement between the platen and the detecting means. The moving amount measuring measures an amount of the relative movement. The determining means determines the size of the original on the platen based on the detection output of the detecting means and the measurement output of the moving amount measuring means. The control means controls output timing of the irradiation instructing means so that the detecting means can detect the change in the intensity of the light corresponding to the original on the platen.

In order to attain the above described objects, an original size detecting apparatus according to an aspect of the present invention includes a platen, irradiating means, detecting means, executing means, moving amount measuring means, storing means, determining means, and control means. An original is placed on the platen. The irradiating means irradiates the platen on which the original is placed. The detecting means receives light reflected from the platen irradiated by the irradiating means and detects a rear edge of the original. The executing means executes a relative movement between the platen and the detecting means. The moving amount measuring means measures an amount of the relative movement. The storing means stores the amount of the relative movement measured by the moving amount measuring means, in response to a detection output of the detecting means. The determining means determines a size of the original on the platen, based on the amount of the relative movement stored in the storing means. The control means controls the irradiating means so that a start of irradiation comes after a start of the relative movement.

In order to attain the above described objects, an original size detecting apparatus according to another aspect of the present invention includes a platen, irradiating means, detecting means, executing means, moving amount measuring means, storing means, determining means, and control means. An original is placed on the platen. The irradiating means irradiates the platen on which the original is placed. The detecting means receives light reflected from the platen irradiated by the irradiating means and detects a rear edge of the original. The executing means execute a relative movement between the platen and the detecting means. The moving amount measuring means measures an amount of the relative movement. The storing means stores the amount of the relative movement measured by the moving amount measuring means, in response to a detection output of the detecting means. The determining means determines a size of the original on the platen based on the amount of the relative movement stored in the storing means. The control means controls the irradiating means so that the irradiating means starts irradiation simultaneously with a start of the relative movement.

In the original size detecting apparatus thus constructed, the relative movement for detection of the original size is started before the irradiating means attains the prescribed amount of irradiation and consequently the detection operation is speeded up, making it possible to suppress a temperature rise on the platen caused by the irradiation of the irradiating means.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

FIGS. 1 through 10A to 10D show an embodiment of the present invention.

Figure 1:
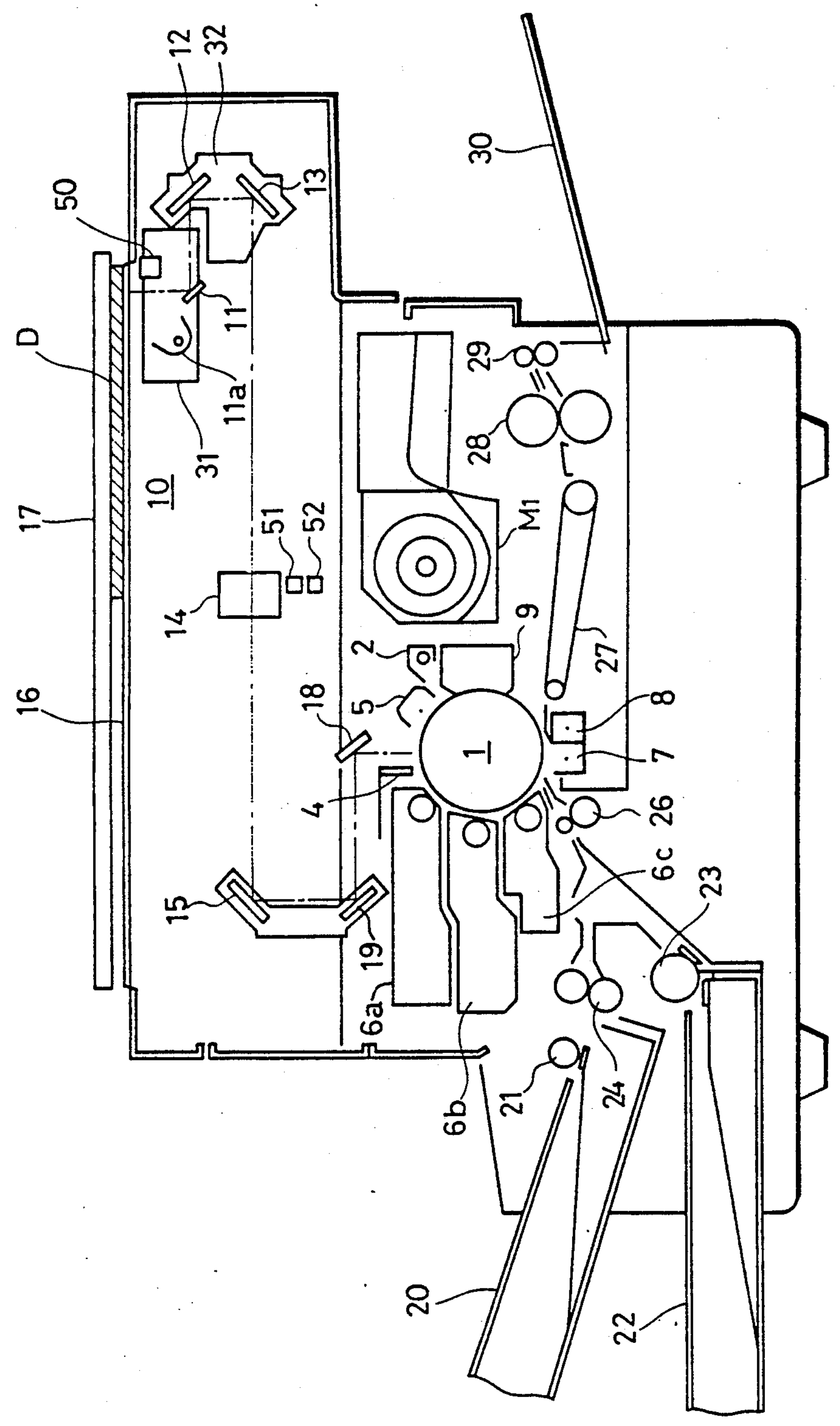
FIG. 1 is a front sectional view showing schematically a construction of a copying apparatus according to an embodiment of the present invention.

FIG. 1 is a front sectional view showing a general construction of a copying apparatus. A photoconductive drum 1 is rotatable counterclockwise is provided nearly at the center of the main body of the copying apparatus. A main eraser lamp 2, an LED array 4, a corona charger 5, developing units 6*a*, 6*b* and 6*c*, a transfer charger 7, a separation charger 8, and a cleaning device 9 of a blade type are provided around the photoconductive drum 1. The photoconductive drum 1 has its surface provided with a photoconductive layer. When the drum 1 passes along the eraser lamp 2 and the corona charger 5, its surface is uniformly charged and then exposed to an image from an optical system 10.

The optical system 10 is provided under a platen glass 16 to scan an image of an original D. It comprises an exposure lamp 11*a*, movable mirrors 11, 12 and 13, a lens 14, and fixed mirrors 15, 18 and 19. A scanner 31 comprising the exposure lamp 11*a* and the movable mirror 11 moves at a speed v/n (n being a copying magnification) with respect to a rotating speed v of the photoconductive drum 1 and a slider 32 comprising the movable mirrors 12 and 13 is driven by a scan motor so as to move at a speed v/2n.

An original cover 17 has a lower surface, which serves to press the original D, and it is colored in yellow to make it easy to optically detect presence/absence of the original D.

Figure 2:
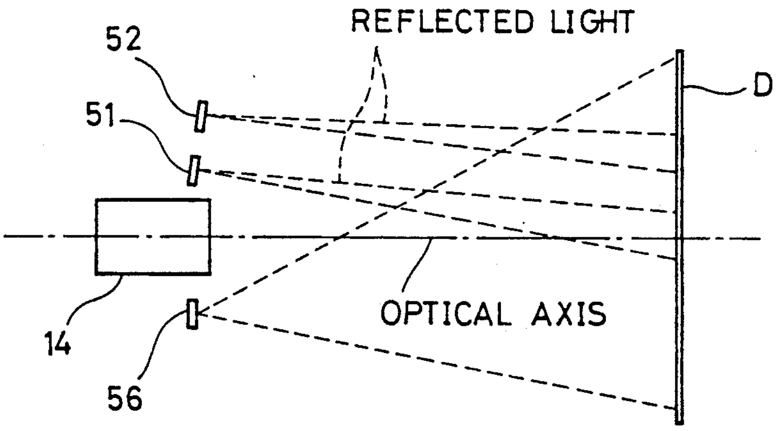
FIG. 2 is a schematic illustration showing a development on line coordinates of the optical path of the optical system shown in FIG. 1.

FIG. 2 is an illustration showing development in straight lines of the light emitted from the light source 11*a* and reflected on the original D to attain the lens 14, the first sensor 51 and the second sensor 52 through a light path of the optical system 10.

Referring to FIG. 1, a reference position sensor 50 which turns on and off by movement of scanner 31 is provided under a top end of the platen glass 16. As a result, a leading edge position of the original is detected at the time of scanning the original D or reading the original size and a reference signal is outputted. A first sensor 51 and a second sensor 52 for receiving light emitted from the light source 11*a* and reflected on the original D and detecting presence/absence of the original at a specified position in the longitudinal and transverse directions of the original D are provided near the lens 14.

The first sensor 51 detects the length direction of the original D (that is, the scanning direction of the scanner 31) and it is located to receive light reflected from the original D during preliminary scanning of the scanner 31, with respect to originals of all specified sizes to be placed on the platen glass 16. More specifically, in the case of a copying apparatus which sets the original D to a central position of the platen glass 16 in the transverse direction, the first sensor 51 is located for sensing a center in the transverse direction of the platen glass. The first sensor 51 receives reflected light from the central position of the original D by preliminary scanning.

The second sensor 52 receives reflected light from the position of the original different from the first sensor 51 and detects the direction of setting the original D on the platen glass 16, that is, determines whether the original D is placed in the longitudinal direction along the scanning direction or in the transverse direction on the platen glass 16. For example, in the case of an original of the A4size or the B5size, the second sensor 52 is located toward a position where light reflected from the original placed in the longitudinal direction is not received and only the light reflected from the original placed in the transverse direction can be received. More specifically, the second sensor 52 is located at a position distant from the first sensor 51 by a predetermined distance in a direction (the direction penetrating the paper surface of FIG. 1) perpendicular to the scanning direction.

Since each of those first and second sensors 51 and 52 has a blue transmission filter and the original cover is colored in yellow, the original D can be easily detected optically. The AE sensor 53 effects automatic exposure adjustment and detects the density of the original D.

On the other hand, on the left side of the main body of the copying apparatus, there are upper feed portion 20 and a lower feed portion 22 provided with feed rollers 21 and 23, respectively. Copy paper fed from either feed portion moves through a transport path including a roller pair 24, a timing roller pair 26, a transport pair 27, a fixing device 28 and a discharge roller 29. During this movement, an image on the photoconductor drum 1 is transferred onto the copy paper and fixed by the fixing device 28 and the copy paper is discharged onto the discharge tray 30.

Figure 3:
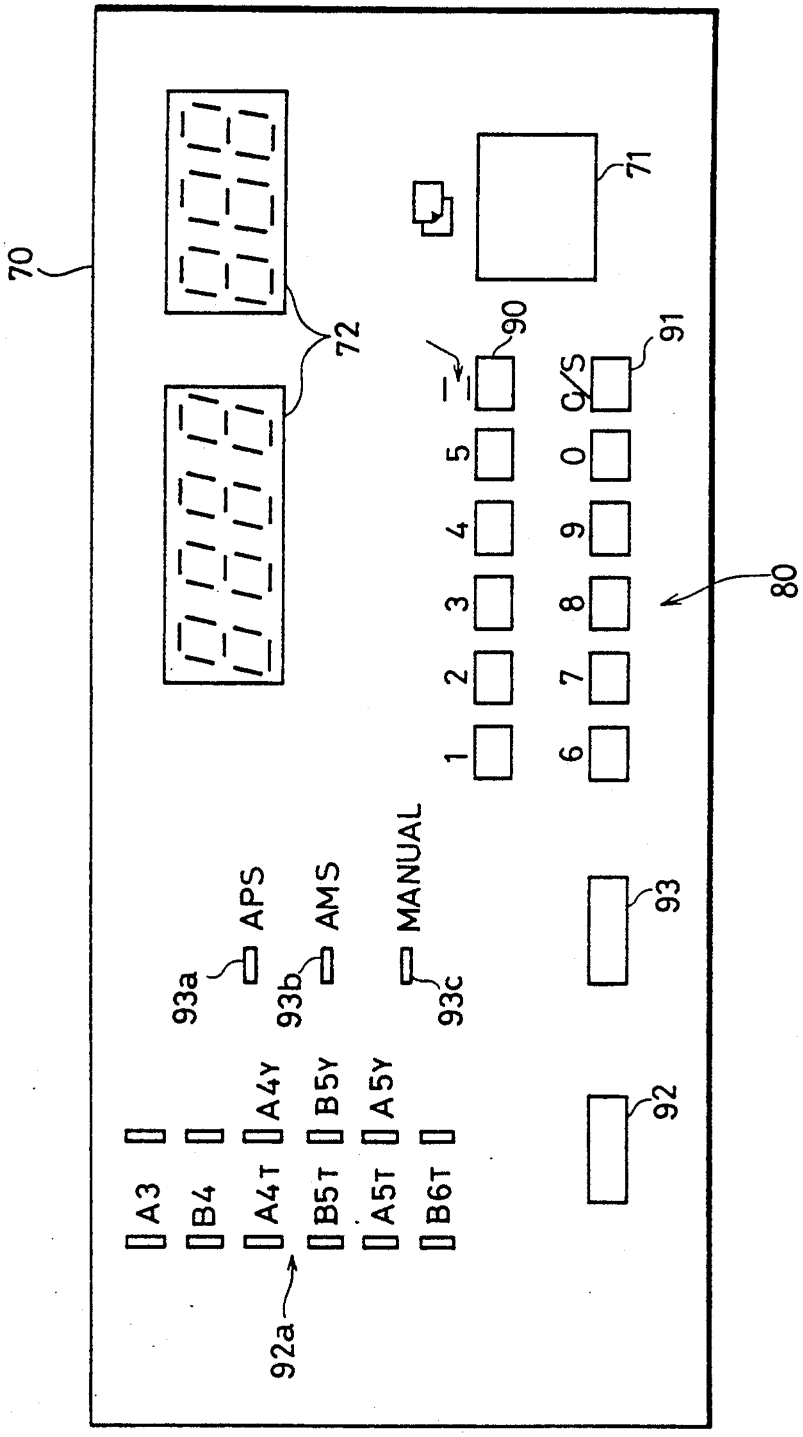
FIG. 3 is a plan view of an operation panel provided on the upper surface of the copying apparatus of FIG. 1.

FIG. 3 is a plan view of an operation panel provided on the upper surface of the copying apparatus.

The operation panel 70 comprises: a print start key 71 for starting copy operation; display portions 72 formed by 7-segment LEDs or the like on which the number of copies and other information are displayed; ten-key pads 80 including ten numerical value keys from 0 to 9 for inputting the number of copies and the like; an interruption key 90 for designating interruption copy; a clear stop key 91; a paper selection key 92 for designating any of copy paper sheets in paper feed cassettes attached in multiple stages according to the size and the longitudinal or transverse direction; paper display elements 92*a* for displaying the size and the longitudinal or transverse direction of the selected copy paper; a mode switching key 93 for successively switching among an automatic paper selection mode, an automatic magnification selection mode and a manual mode; mode display elements 93*a* to 93*c* for displaying the selected mode, etc. In addition, though not shown, the operation panel 70 comprises an upkey and a downkey for changing and setting the density of a copy image by steps; a density display portion for displaying the set density; a magnification setting key for manually setting a copying magnification; a magnification display portion for displaying the set magnification, etc.

Figure 4:
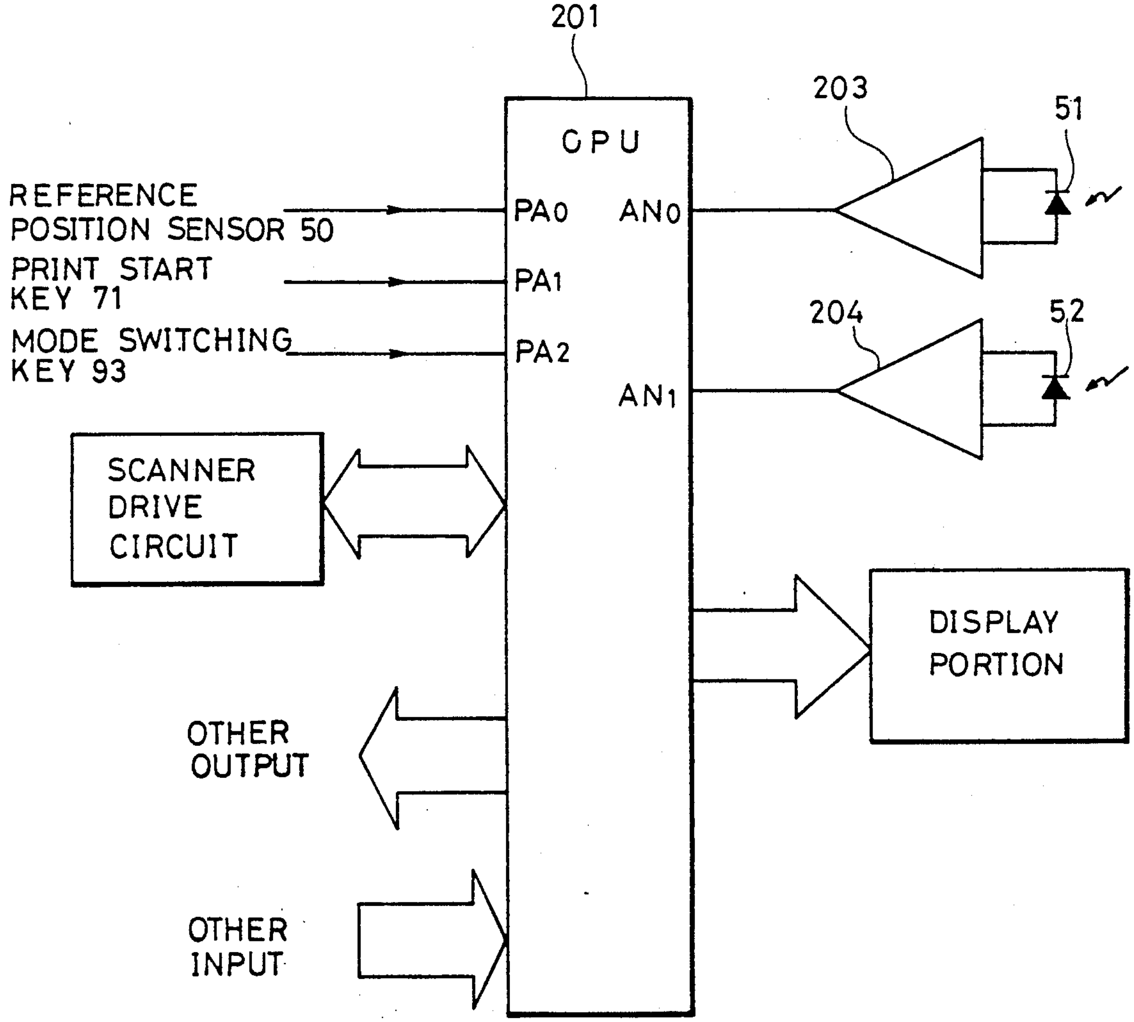
FIG. 4 is a circuit diagram showing a control circuit of a copying apparatus according to an embodiment of the invention.

FIG. 4 is a circuit diagram showing a control circuit of the copying apparatus.

An analog input terminal of a CPU 201 formed by a microcomputer is connected with amplifiers 203 and 204 for amplifying the outputs of the first and second sensors 51 and 52, and various keys as described above, display elements and drive circuits of motors and clutches and the like are connected to other input terminal of the CPU 201.

In this embodiment, preliminary scanning in which the scanner 31 moves while irradiating the original D is effected to detect the size of the original D before exposure scanning for copy operation by the scanner 31. During the preliminary scanning, light reflected from the original is applied to the first and second sensors 51 and 52. The first and second sensors 51 and 52 output a signal is amplified by the amplifiers 203 and 204 and then inputted to the CPU 201.

The CPU 201 digitally converts the signals inputted from the amplifiers 203 and 204 and detects the size and the set direction (the longitudinal or transverse direction) of the original by a program stored in the CPU 201, based on the data thus obtained and it executes control according to the original size and the set direction thereof.

A reference position sensor 50 is used to detect a leading edge of an image in copy operation and to obtain a reference signal serving as a reference point for measurement of the original length in preliminary scanning for detection of the original size.

Figure 5:
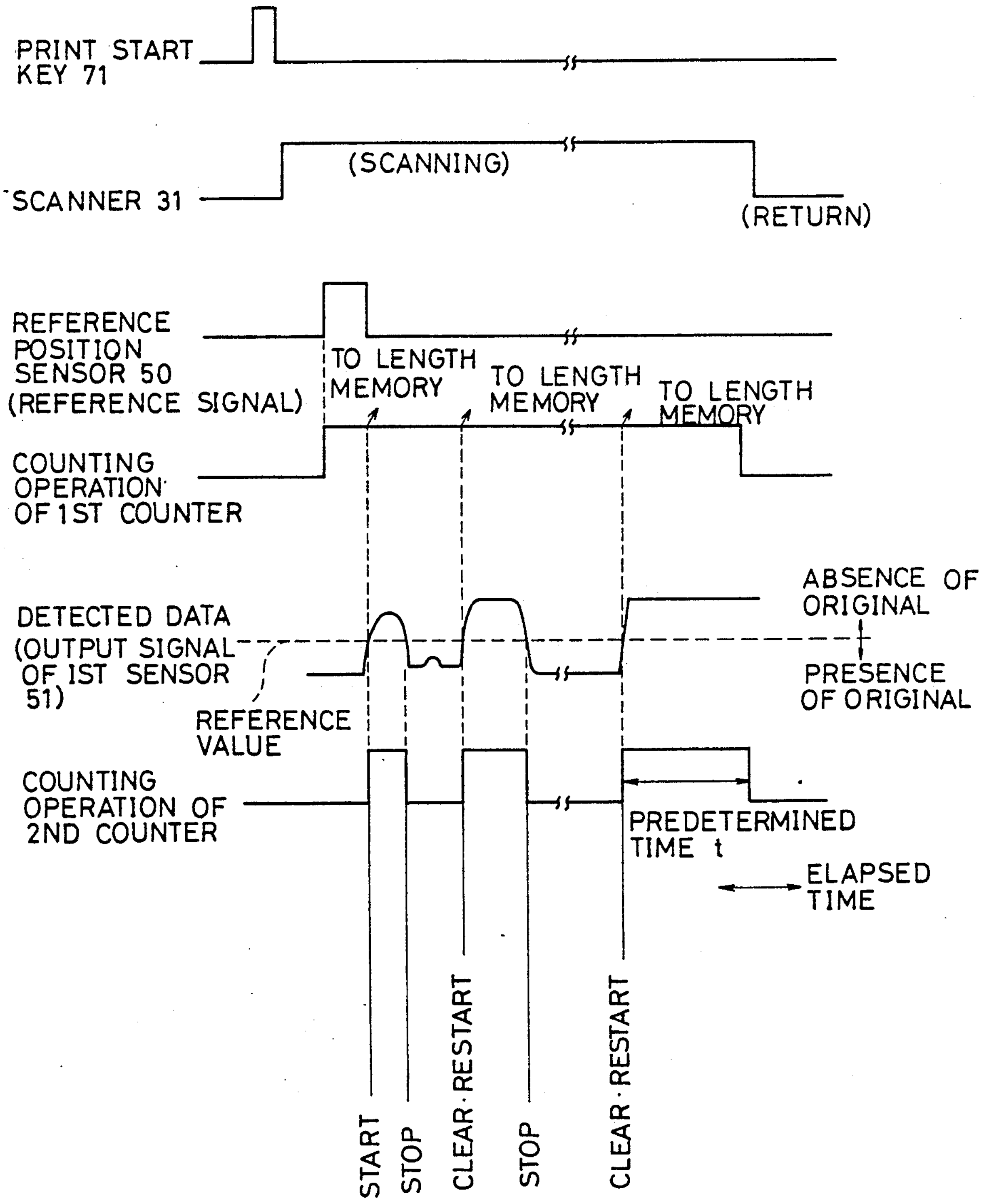
FIG. 5 is a timing chart showing signal conditions when an original size is detected by preliminary scanning according to the embodiment of the invention.

FIG. 5 is a timing chart showing signal conditions for detecting the original size by preliminary scanning. Referring to FIG. 5, original size detecting operation will be described.

When an on-edge of the print start key 71 is detected, preliminary scanning is started and the scanner 31 starts to move in the scanning direction.

When the scanner 31 reaches near a leading edge position of the original D, the scanner 31 operates the reference position sensor 50 and the reference signal is outputted from the reference position sensor 50.

With timing for outputting the reference signal, the first counter in the CPU 201 starts counting. The value of the first counter increase for every cycle.

The CPU 201 samples and digitally converts the signal from the first sensor 51 and uses it as detection data, whereby the detection data is compared with a predetermined reference value. If the data is larger than the reference value, it is determined that no original exists. If it is smaller than the reference value, it is determined that an original exists.

When the determination of the CPU 201 changes from presence of an original to absence of an original, the count value of the first counter at that time is stored in a length memory contained in the CPU 201. The content of the length memory is renewed each time when the determination changes from presence of an original to absence of an original and therefore only the newest count value is stored therein.

Simultaneously with the change from presence of an original to absence of an original, the second counter contained in the CPU 201 starts counting. The second counter thus started stops when the determination changes from absence of an original to presence of an original and the count value is cleared when the determination is changed again to absence of an original, whereby counting is started again.

When the count value of the second counter exceeds a predetermined value (predetermined time t), it is determined that the original D does not exist at a position corresponding to the scanner at that time, and the preliminary scanning is terminated to return the scanner 31 to the initial position (the home position).

After the preliminary scanning is terminated, the original length is determined by the count value stored finally in the length memory.

More specifically, the signal from the first sensor 51 changes dependent on the pattern or density of the original D and even if it is determined that no original exists although the original D actually exists, when the determination changes to presence of the original during the predetermined time t of counting by the second counter, only the count value at the time of next change to absence of an original is stored in the length memory and the original length is determined by the final count value.

Accordingly, even if the intensity of light changes dependent on the pattern or density of the original, this does not influence the original length to be detected. Thus, even if absence of an original is determined during detection of the original, this determination is disregarded and a correct original length is detected without erroneous determination that the original length is shorter than the actual length.

The second sensor 52 detects the set direction of the original D as described previously and accordingly determines whether the longer sides of the original are along the scanning direction or not. After the above described reference signal is outputted, the CPU 201 samples and digitally converts the signal of the second sensor 52 (that is, the output of the amplifier 204) with predetermined cycles and compares the obtained data with a predetermined reference value. If the data is larger than the reference value, it is determined that an original does not exist. In the reverse case, it is determined that an original exists. If the number of the determinations of presence of the original out of a predetermined number of data is larger than a specified number, it is determined that the original D is set with the shorter sides thereof along the scanning direction.

Based on the results of determinations as to the original length and the set direction, the original size such as the A4, A5 or B5 size and the set direction are correctly detected. In addition, the length of the original D can be detected at the time when the predetermined time t has passed after the scanning of the length of the original D. More specifically, if the length of the original D is short, the scanner 31 does not need to effect full scanning over the whole length of the platen glass 16. It becomes possible to detect the original size by scanning for a short time and to prevent lowering of the first copy speed of the copying apparatus.

Referring now to flow charts of FIGS. 7 to 10, copy operation and original size detecting operation of the copying apparatus will be described.

Figure 7:
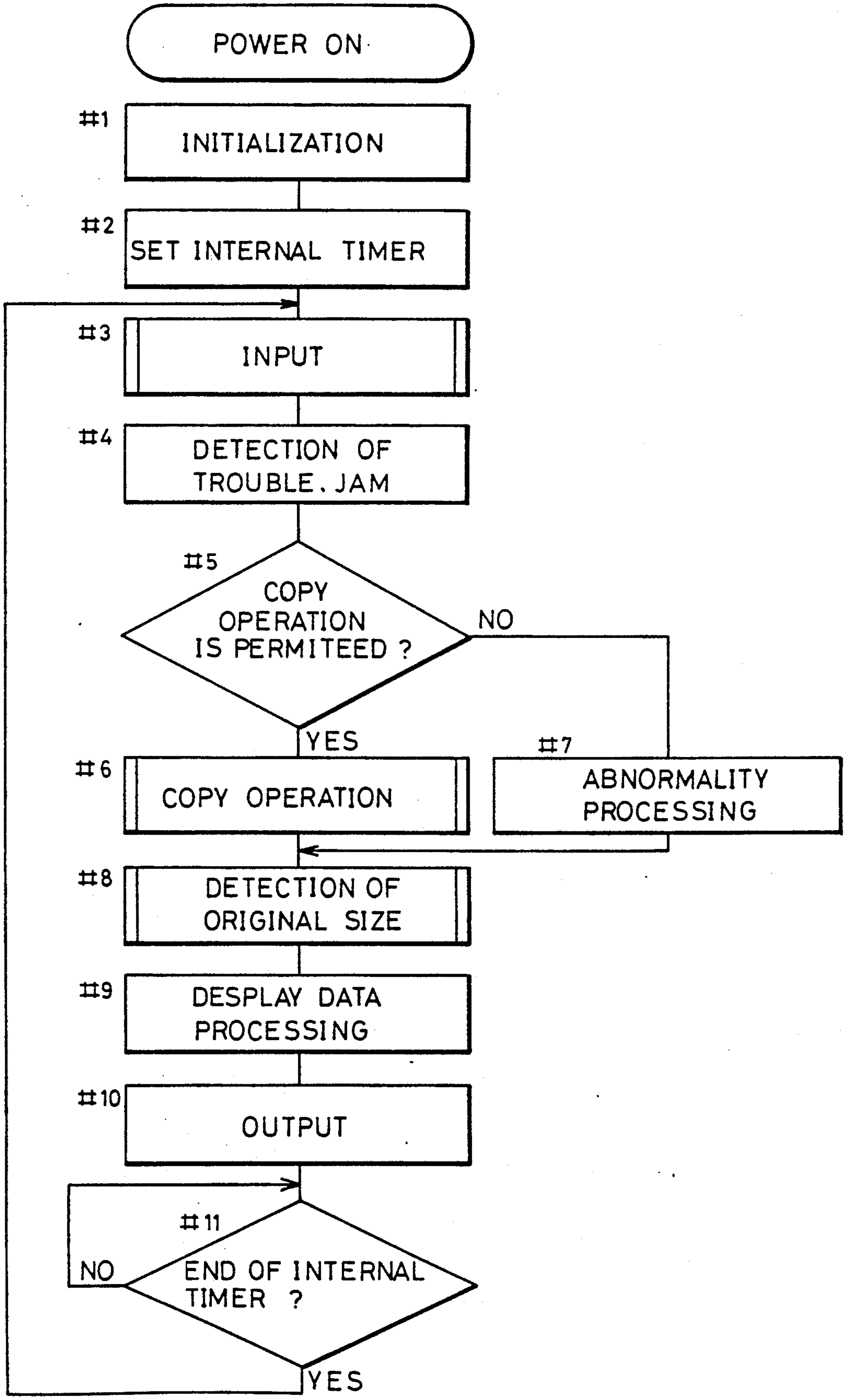
FIG. 7 is a flow chart showing a main routine of a CPU 201 according to the embodiment of the invention.

FIG. 7 is a main flow chart of the copying apparatus. Initialization is effected in step 1 to set the CPU 201 to the initial state and to set the copying apparatus to the initial mode after turn-on of the power supply.

In step 2, an internal timer for defining a period of one routine is set. Thus, procedures of steps 3 to 10 are carried out for each predetermined time.

In step 3, an input routine is executed to input signals from various keys on the operation panel 70, the reference position sensor 50, the first sensor 51, the second sensor 52, the AE sensor 53 and other switches or sensors not shown.

In step 4, operation conditions of the copying apparatus such as occurrence of any trouble or paper jam are detected based on the input results of step 3. Based on the result of the detection, it is determined in step 5 whether copy operation is permitted or not.

If copy operation is permitted, a copy operation routine is executed in step 6. If it is not permitted, an abnormality processing routine is executed in step 7.

In step 8, an original size detection routine is executed to detect the original size.

In step 9, data displayed on the respective display portions of the operation panel 70 are processed and in step 10, the data are displayed or signals for controlling the respective components of the copying apparatus are outputted.

After the above mentioned procedures have been executed, there is a wait for an end of the previously set internal timer in step 11, so that the period of one main routine may be constant.

Figure 8:
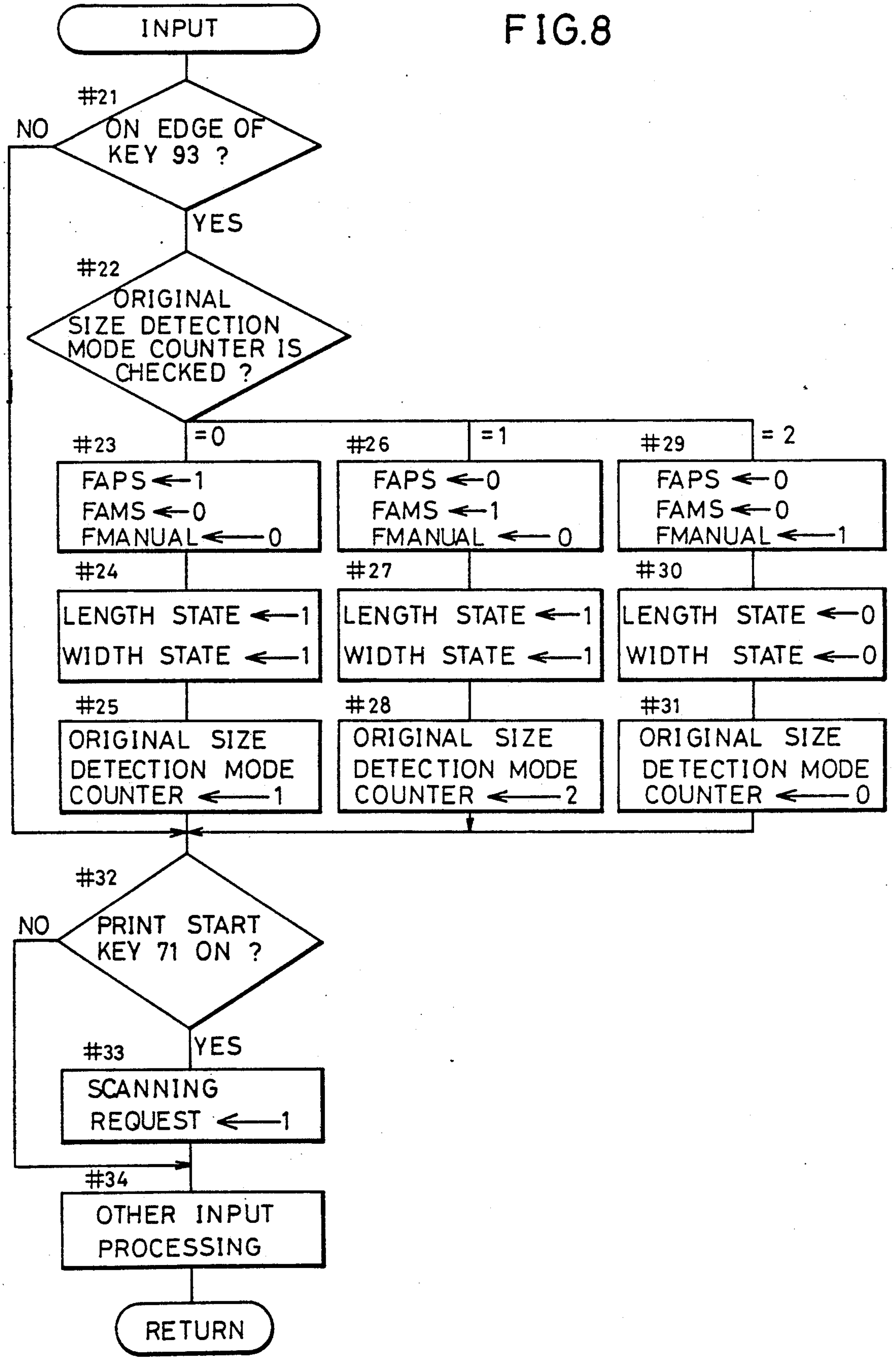
FIG. 8 is a flow chart showing detailed procedures of the input routine in FIG. 7.
Figure 9A:
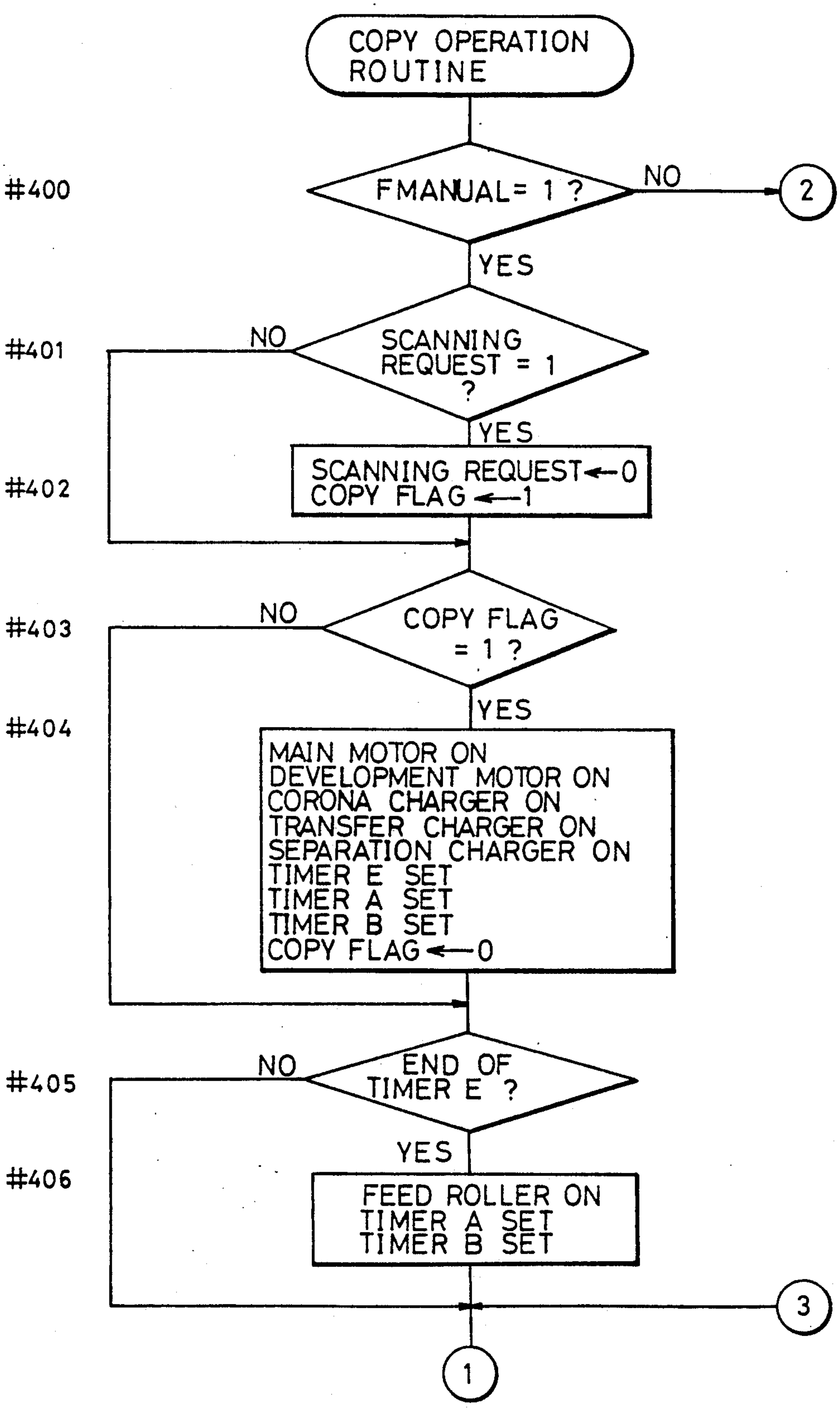
FIGS. 9A to 9D are flow charts showing detailed procedures of the copy operation routine in FIG. 7.
Figure 9B:
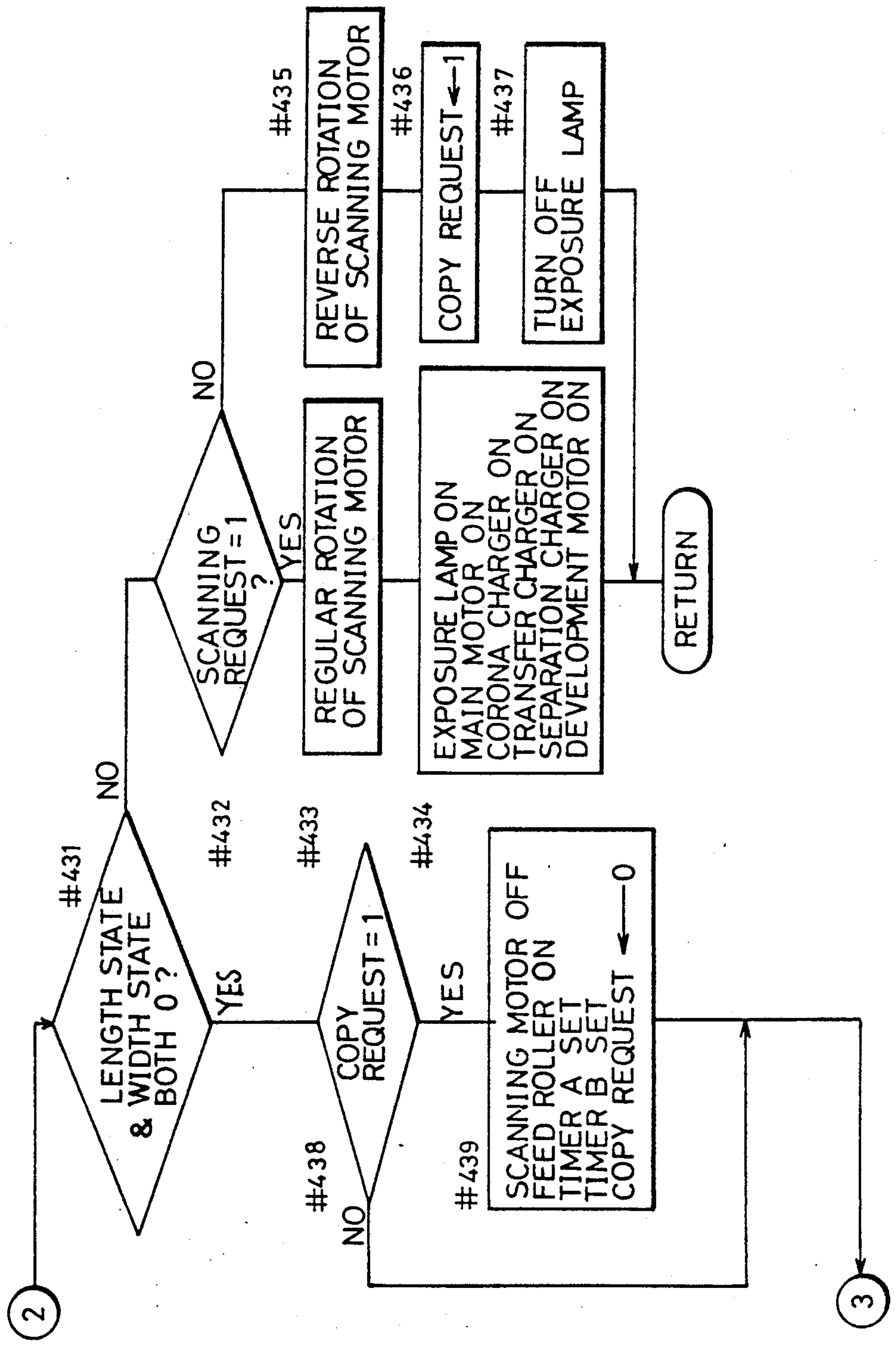
Figure 9C:
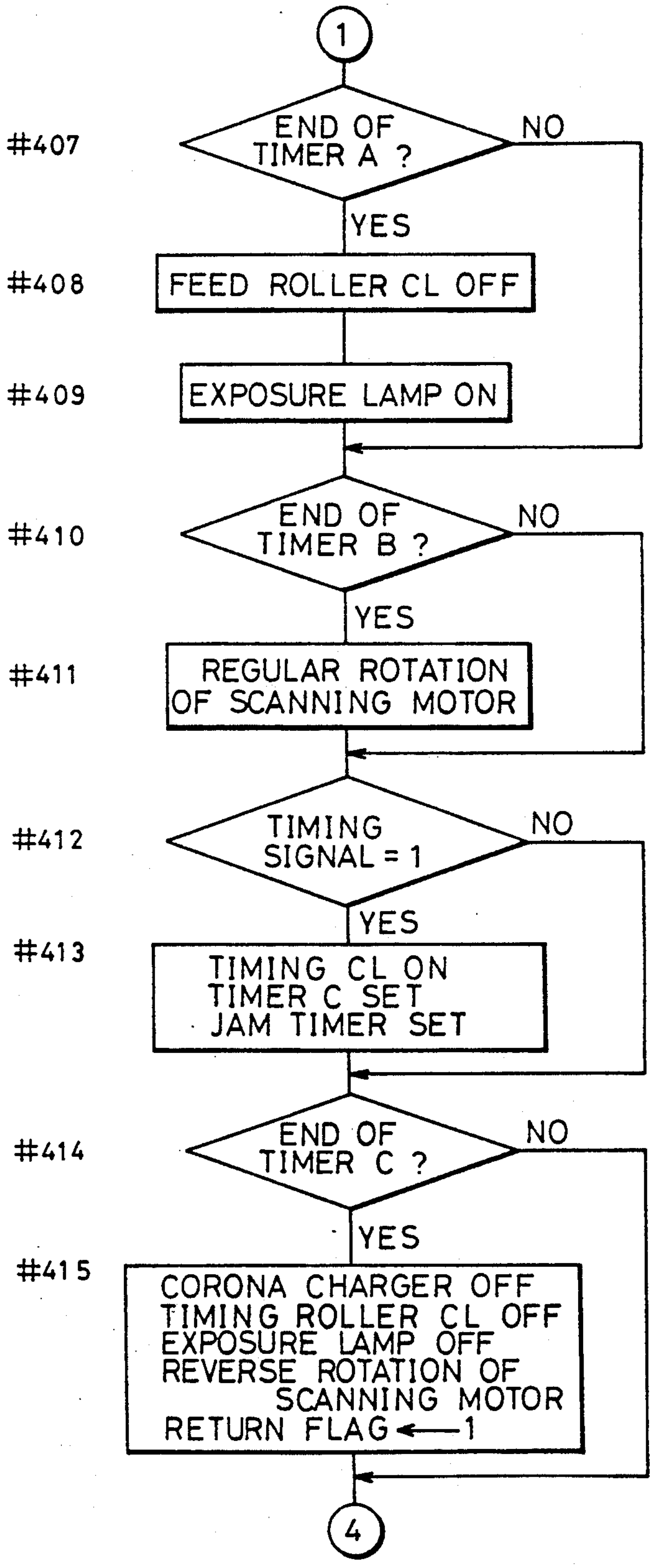
Figure 9D:
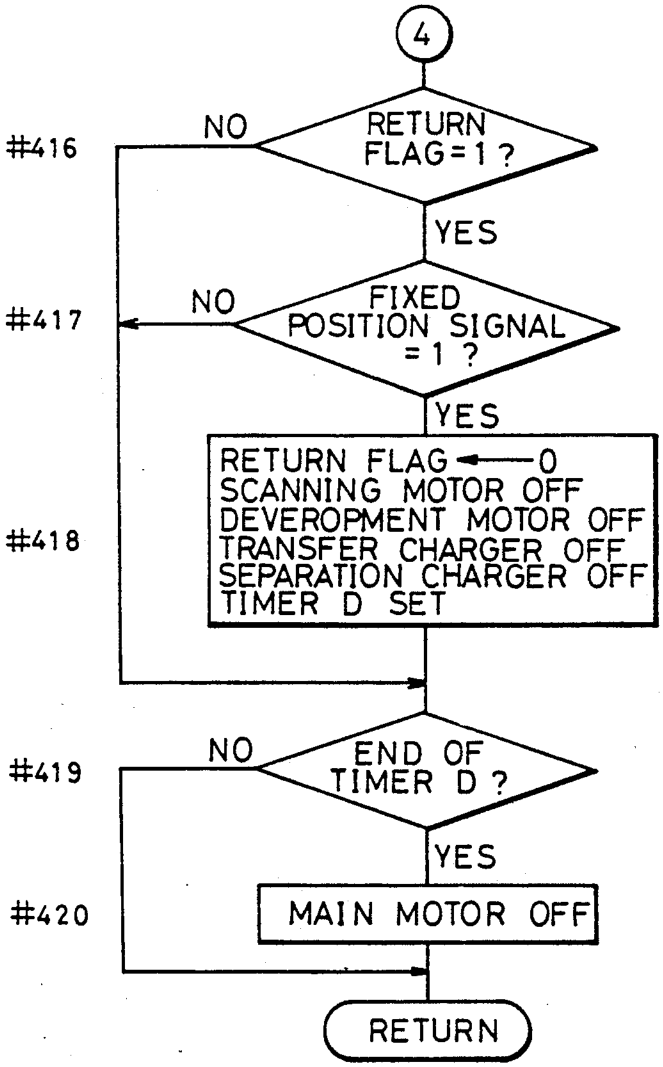

FIG. 8 is a flow chart of the input routine of step 3 shown in FIG. 7.

In step 21, it is determined based on the on-edge of the mode switching key 93 whether the key 93 is pressed or not. If it is pressed, procedures starting from step 22 are executed.

In step 22, the content of the original size detection mode counter is checked and a detection mode is selected according to the content.

The detection modes include three modes, namely, an automatic paper selection mode (APS mode) for selecting a paper size and a preset magnification, an automatic magnification selection mode (AMS mode) for setting a copying magnification based on the result of the original size detection and a preset size of paper, and a manual mode for manually selecting a paper size and setting a copying magnification without original size detection. When any of the detection modes is selected, it is displayed on the corresponding one of the mode display elements 93*a* to 93*c*.

In the APS mode, a flag FAPS indicating the APS mode is set to 1 and flags FAMS and FMANUAL indicating the other detection modes are reset to 0 (in step 23). A length state and a width state are set to 1 to execute original size detection procedures (in step 24) and the content of the original size detection mode counter is set to 1 (in step 25).

In the AMD mode, the flag FAMS indicating the AMS mode is set to 1 and the flags showing the other direction modes are reset to 0 (in step 26). The length state and the width state are set to 1 (in step 27) and the content of the original size detection mode counter is set to 2 (in step 28).

In the manual mode, the flag FMANUAL indicating the manual mode is set to 1 and the flags indicating the other detection modes are reset to 0 (in step 29). The length state and the width state are reset to 0 so as not to execute original size detection (in step 30) and the content of the original size detection mode counter is reset to 0 (in step 31).

In the above described procedures, each time the mode switching key 93 is pressed, switching is effected in a rotating order of the APS mode, the AMS mode, the manual mode, the APS mode etc.

In step 32, it is determined whether the print start key 71 is pressed or not. If it is pressed, the flag requesting scanning is set to 1 and control according to the above described detection mode is started.

In step 34, signals from other keys on the operation panel 70, other sensors located in the copying apparatus and the like are inputted.

FIGS. 9A to 9D are flow charts of the copy operation routine of step 6 shown in FIG. 7.

First in step 400, it is determined whether the flag FMANUAL is 1 or not, in order to determine whether the mode for detecting the original size is set or not.

If the flag FMANUAL is 1, it means that the manual mode is set and it is not necessary to detect the original size. Accordingly, the procedures beginning with step 401 are executed to control normal copy operation.

The steps 401 to 404 relate to procedures from the turn-on of the print start key 71 to the preliminary processing for image formation. First, in step 401, it is determined whether the scanning request flag is set to 1 or not. If the flag is set, the flag is reset in step 402 and the copy flag is set. If the copy flag is 1 (YES in step 403), the main motor, the development motor, the corona charger 5, the transfer charger 7 and the separation charger 8 are turned on for the preliminary processing. Further, a timer E for defining a preliminary processing time, a timer A for defining the on time of the feed roller, and a timer B for defining the time until the start of scanning for waiting for a rise of the exposure lamp 11*a* are set appropriately and then the copy flag is reset.

When the timer E comes to an end in step 405, the feed roller of the upper feed portion 20 or the lower feed portion 22 is turned on in step 406.

If the set time of the timer A is terminated in step 407, the feed roller clutch is turned off (in step 408) and the exposure lamp 11*a* is turned on (in step 409).

If the set time of the timer B is terminated in step 410, the scanning motor is rotated in the regular direction (in step 411), thereby starting the scanning of the optical system 10 including the scanner 31.

If the timing signal is 1 in step 412, the clutch of the timing roller pair 26 is turned on in step 413 and the timer C for defining the on time is set, and then the jam timer is set.

If the set time of the timer C is terminated in step 414, the corona charger 5, the exposure lamp 11*a* and the clutch of the timing roller pair 26 are turned off in step 415. Then, the scanning motor is rotated in the reverse direction and a return flag indicating return operation of the optical system 10 is set.

Then, if the return flag is 1 in step 416, this means that the optical system 10 is in return operation and accordingly there is a wait in step 417 until the optical system 10 returns to the home position, that is, until the fixed position signal changes to 1.

When the optical system 10 returns to the home position, the fixed position signal is 1 and, accordingly, the return flag is reset and the scanning motor is stopped in step 418. Further, the development motor, the transfer charger 7 and the separation charger 8 are turned off and the timer D for stopping the main motor is set.

When the set time of the timer D is terminated in step 419, the main motor is stopped in step 420, whereby copy operation is terminated.

On the other hand, in the case of NO in the above mentioned step 400, that is, if the flag FMANUAL is not 1, the procedures starting with step 431 are executed to detect the original size.

In step 431, it is determined whether the length state and the width state are both 0 or not.

The length state and the width state are states for controlling the detection of the original size and they are maintained at the values 1 to 4 dependent on the state during the detection. There are two cases in which those states are 0, namely, the case of the manual mode in which the detection of the original size is not effected and the case in which the detection of the original size is terminated and the optical system 10 is returned to the home position.

In the case of NO in step 431, it is determined in step 432 whether a scanning request is issued or not. If the scanning request is issued, the scanning motor is rotated in the regular direction in step 433 to effect scanning. Then, in step 434, the exposure lamp 11*a*, the main motor, the development motor, the corona charger 5, the transfer charger 7 and the separation charger 8 are turned on.

More specifically, in step 434, the main motor is turned on and the scanning of the optical system 10 is started. At the same time, the exposure lamp 11*a* is turned on, whereby the detection of the original size is started.

Simultaneously with the turn-on of the exposure lamp 11*a*, the scanner 31 of the optical system 10 starts to move. A prescribed time (e.g., 0.5 sec.) is required for the amount of irradiation of the exposure lamp 11*a* to rise to a prescribed value and it takes time for the scanner 31 to reach the rear edge position of the original of the minimum original size detectable (e.g., A6 size). Accordingly, since the rise of irradiation of the exposure lamp 11*a* is completed before the scanner 31 reaches the above mentioned position, no inconvenience is caused in the detection of the original size.

At the same time, the corona charger 5, the transfer charger 7 and the separation charger 8 are turned on, whereby the preliminary processing for the copy operation is performed.

If there is no scanning request in step 432, the scanning motor is rotated in the reverse direction in step 435 and processing for returning the optical system 10 is effected. Then, the copy request flag is set (in step 436) and the exposure lamp 11*a* is turned off (in step 437) so that the apparatus is prepared for the next copy operation.

On the other hand, if YES is determined in the above mentioned step 431, which means that the optical system 10 is returned to the home position, the copy operation is started. More specifically, the setting of the copy operation flag is confirmed in step 406 and the scanning motor is stopped in step 439. Then, the feed roller is turned on, the timers A and B are set and the copy request flag is reset. Subsequently, the processing flow proceeds to step 406, so that copy operation is continuously started.

More specifically, since the procedures corresponding to the preliminary processing in the above mentioned steps 401 to 404 are already executed in steps 432 to 439, the processing flow immediately proceeds to step 407. Thus, the time required for the copy operation is reduced.

Figure 10A:
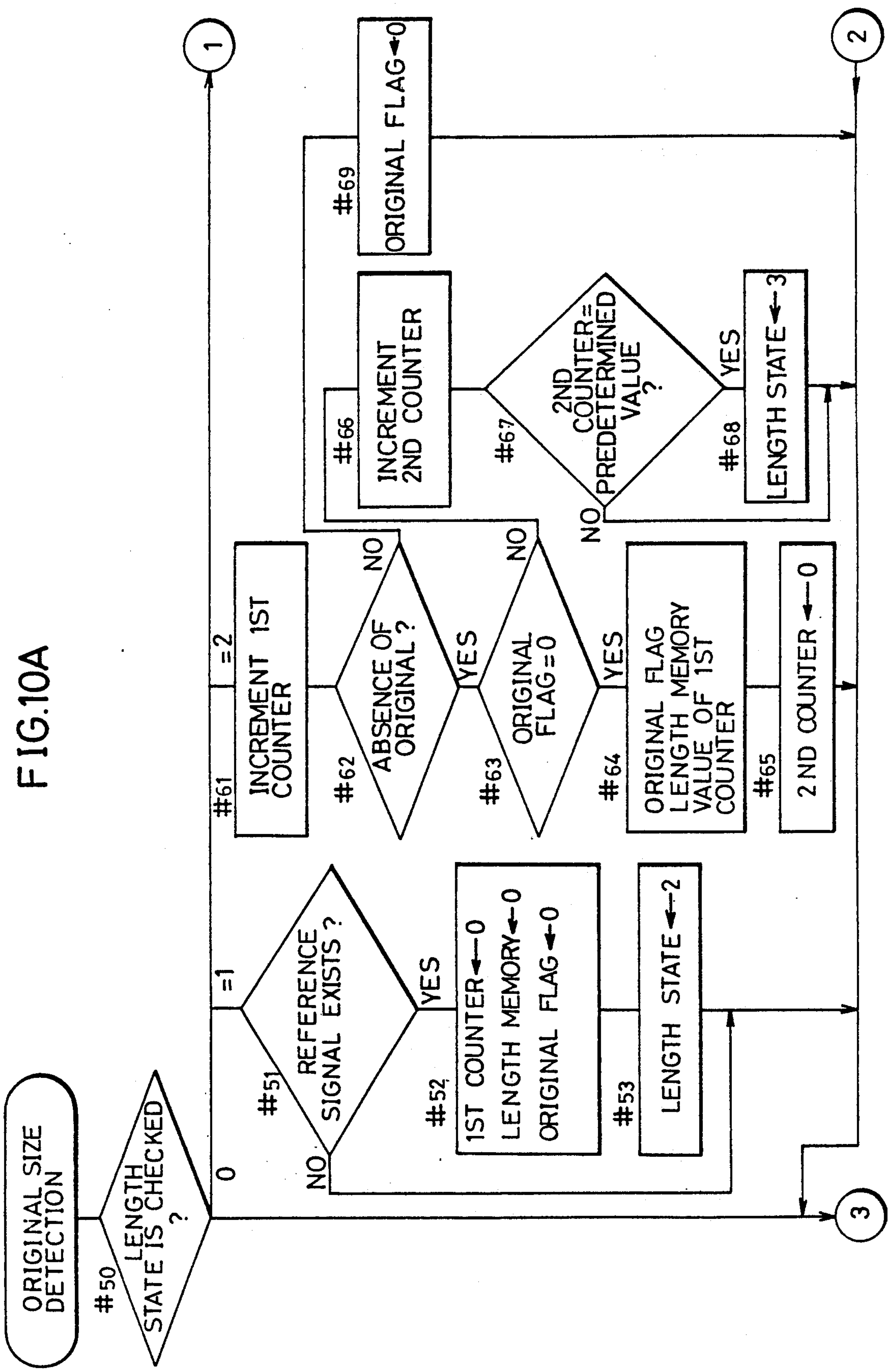
FIGS. 10A to 10D are flow charts showing detailed procedures of the original size detecting routine in FIG. 7.
Figure 10B:
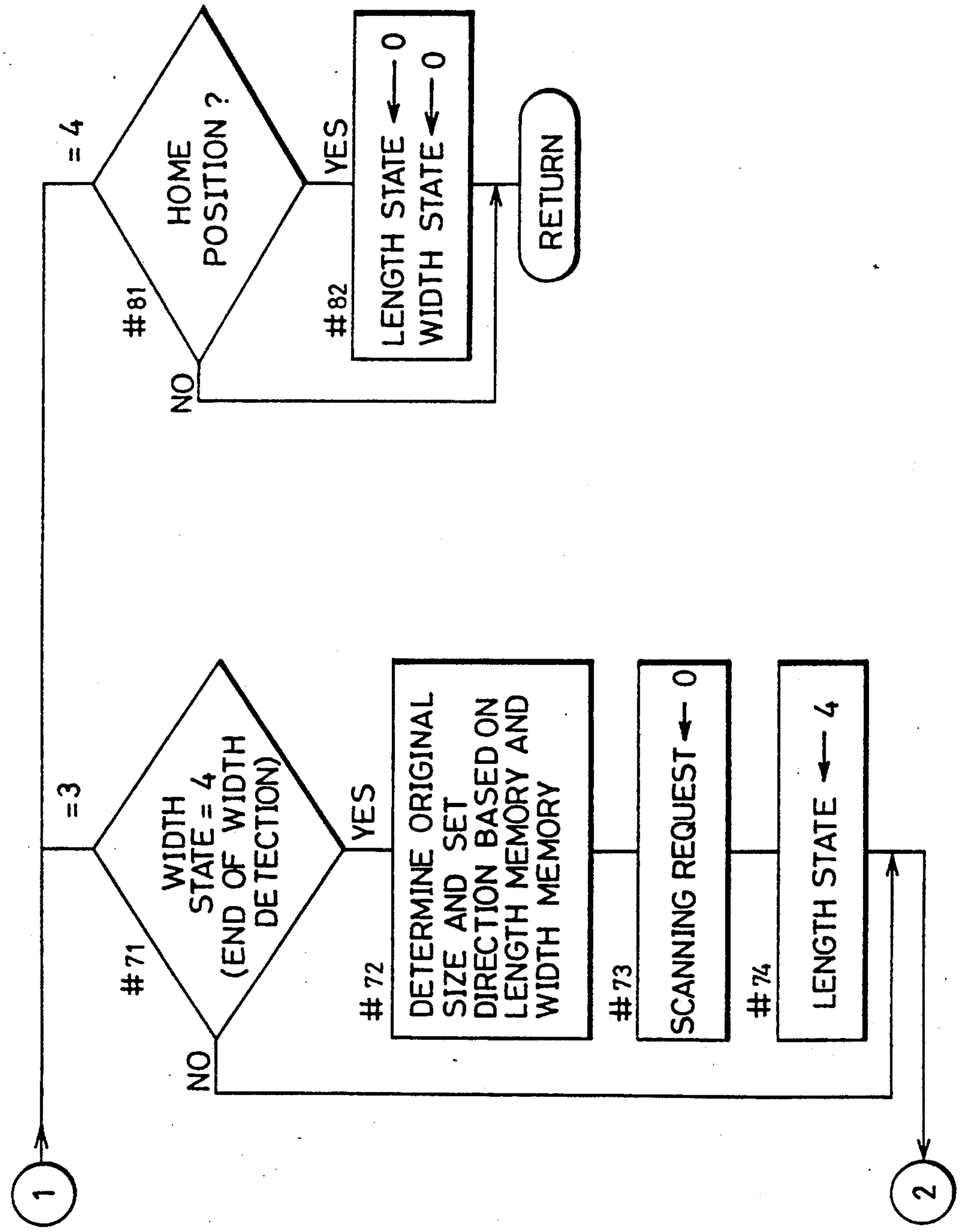
Figure 10C:
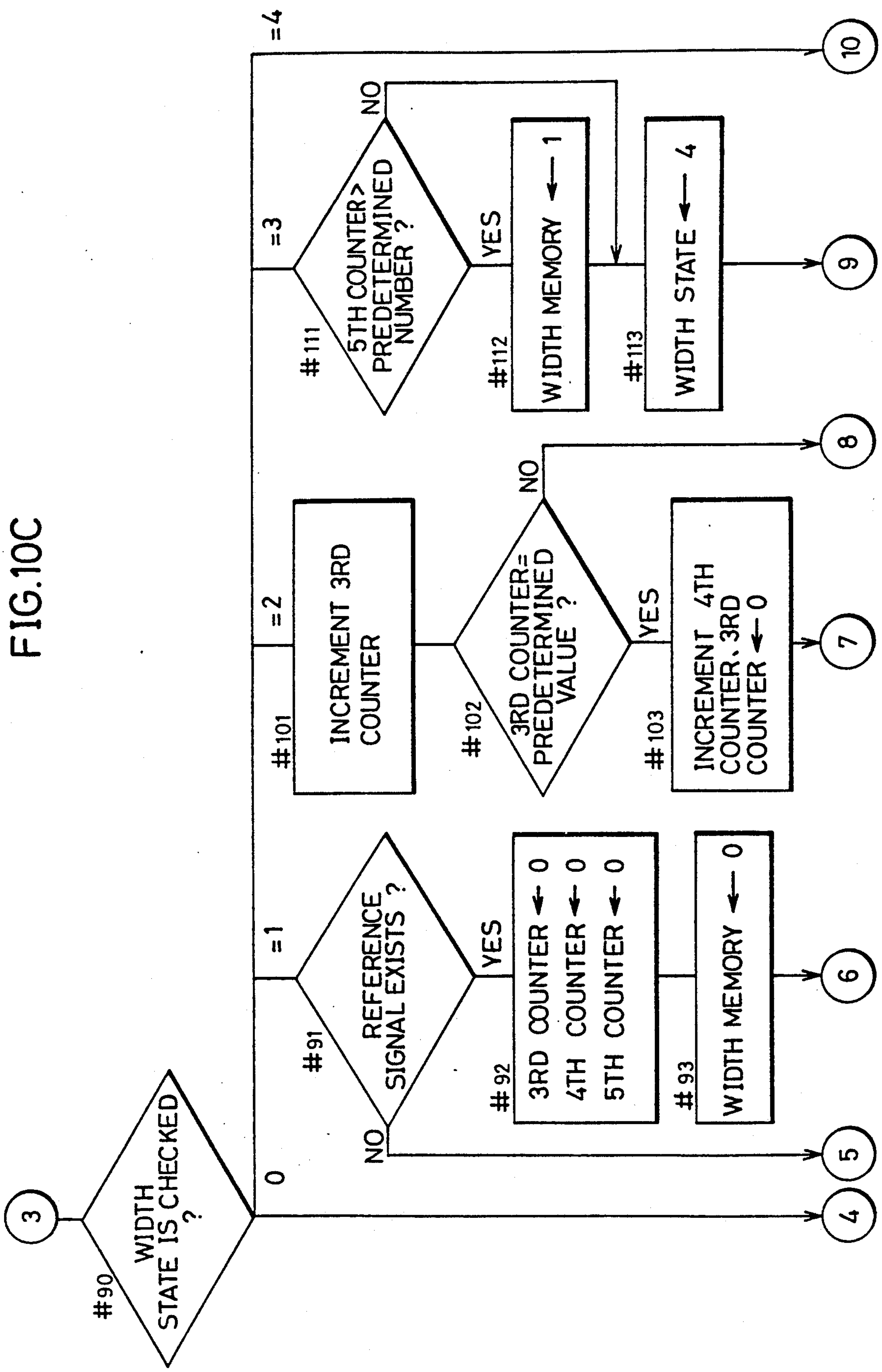
Figure 10D:
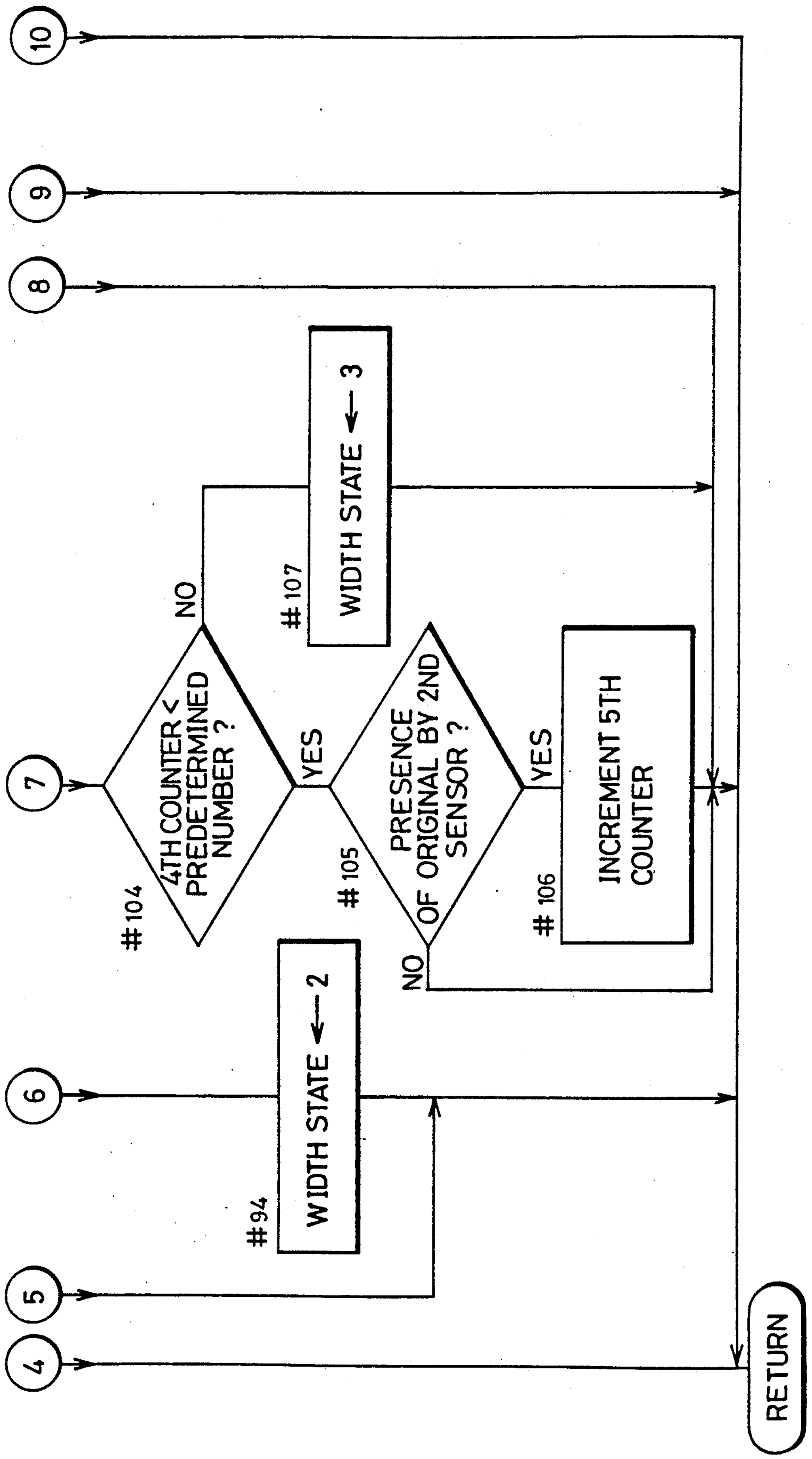

FIGS. 10A to 10C are flow charts of the original size detection routine of step 8 shown in FIG. 7.

In step 50, the content of the length state is checked and if the length state is any of 1 to 4, branching is effected to any of steps 51, 61, 71 and 81.

If the length state is 1 or 2, the length of the original is detected. If the length state is 3, the original size is detected based on the length of the original and the set direction of the original.

If the APS mode or the AMS mode is selected, the length state is set to 1 in step 24 or 27 and accordingly processing starting from step 51 is executed.

If the manual mode is selected, the length state is 0 and accordingly the program jumps to step 90 without executing the above mentioned steps.

If the length state is 1, it is determined first in step 51 whether a reference signal is outputted from the reference position sensor 50 in the moving path of the scanner 31. If the reference signal is outputted, the first counter is cleared to measure the length of the original and the length memory which stores the content of the first counter at the time of change of determination from presence of the original to absence of the original and the original flag indicating presence or absence of the original are initialized.

In step 53, the length state is set to 2. After that, the program proceeds to step 90 for detecting the set direction of the original. In the following, detection processing of the length of the original will be first described.

When the state is 2, the first counter is incremented in step 61 and the output of the first sensor 51 is checked in step 62 to determine presence or absence of the original D in the longitudinal direction. If it is determined by comparison between the output signal and the reference value that the original exists (in the case of NO in step 62), the original flag is reset to 0 (indicating presence of the original).

When absence of the original is determined by the scanning of the scanner 31 (in the case of YES in step 62), the original flag is checked (in step 63). At the time when the detection changes from presence of the original to absence of the original, the original flag is still maintained at 0. Accordingly, the program proceeds to step 64, and processing at the time of change from presence of the original to absence of the original is effected.

More specifically, in step 64, the original flag is set to 1 (indicating absence of the original) and the content of the first counter at that time is stored in the length memory. Then, in step 65, the second counter is cleared to start counting, so that it is determined whether the state of absence of the original continues or not.

Subsequently, unless the state of the absence of the original changes, the program proceeds to step 61, step 62, step 63 and step 66.

In step 66, the second counter is incremented. In step 67, it is determined whether the content of the second counter attains a predetermined value or not. If it attains the predetermined value, the length state is set to 3 (in step 68).

The above described flow of processing applies to the case of the original having little contrast of density. However, originals used in reality have various density patterns. For example, in the case of an original having a black solid area, intensity of reflected light is considerably lowered if the black solid area is scanned, causing the signal of the first sensor 51 to be lowered to the level of absence of the original. Even in such a case, the length of the original can be correctly detected by the below described processing.

Figure 6:
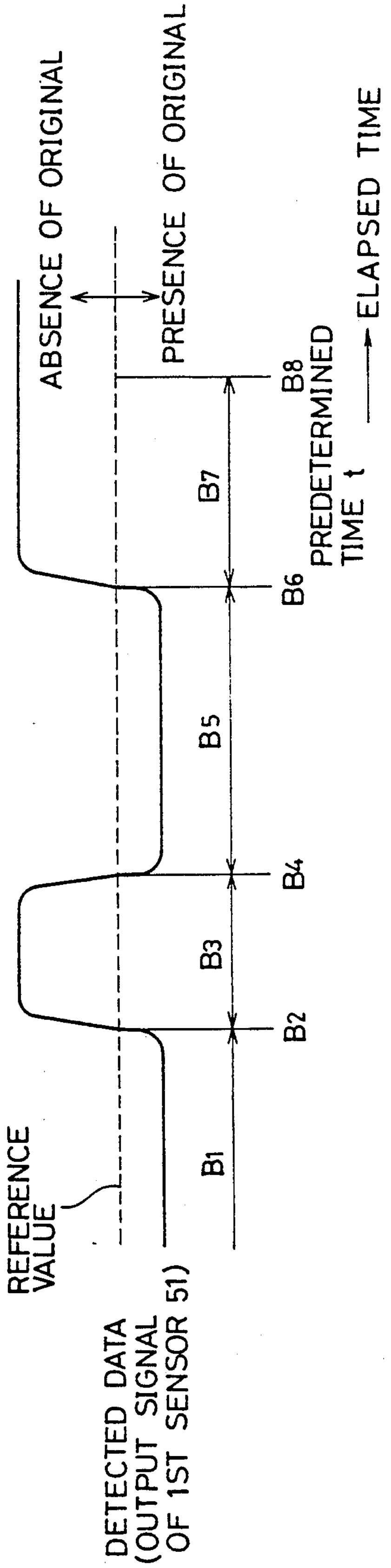
FIG. 6 is a timing chart showing an example of change of detected data for explaining operation of detecting a length of an original according to the embodiment of the invention.

In the following, the original length detection operation will be described also with reference to FIG. 6 showing an example of change of data for explaining the detection operation.

When the scanner 31 is in the area B1 shown in FIG. 6, that is, the first sensor 51 detects the area B1 shown in FIG. 6, it is determined that the document exists and accordingly the determination in step 62 is NO. Thus the program proceeds to step 69.

When the first sensor 51 reaches the point B2 shown in FIG. 6, the determination changes from presence of the original to absence of the original and the determination in step 62 is YES, whereby the program proceeds to step 63. Since the original flag is still 0, the determination in step 63 is YES and the program proceeds to step 64, where the original flag is set to 1.

When the first sensor 51 detects the area B3 in FIG. 6 (for example, a black solid area), absence of the original is determined and since the original flag is 1, processing starting with step 66 is executed.

If the area B3 is within the length corresponding to the predetermined value in step 67, a determination NO is given in step 62 before the determination YES in step 67, when the first sensor 51 attains the point B4. Then, when the original flag is reset to 0 in step 69 and absence of the original is determined, the second counter is reset in step 65. Accordingly, update processing for the length state in step 68 is not executed and detection of the original length is continued.

Thus, the erroneous determination of absence of the original due to a black solid area in the original is disregarded finally.

When the first sensor 51 detects the area B5 and the point B6, the same processing as the above described processing for the area B1 and the point B2 is carried out and the content of the length memory is updated to the count value of the fist counter at the point B6.

If the area B7 is larger than the predetermined time t corresponding to the predetermined value in step 67, it is determined that there is no original in reality when the first sensor 51 attains the point B8, and the length state is updated to 3 in step 68, whereby detection of the length of the original is terminated.

When the length state is 3, it is determined in step 71 whether the width state is 4 or not, that is, whether detection of the original in the transverse direction is terminated or not. In the case of NO, processing starting with step 72 is bypassed and there is a wait until the width state becomes 4.

When the width state becomes 4, the original size and the set direction of the original are determined in step 72 based on the result of detection of the original length and the result of detection of the original in the transverse direction.

In this embodiment, the sizes in the scanning direction of the A3 to A5 and B4 sizes are different except for the case of A4 width (its longer sides perpendicular to the scanning direction) and A5 length (its longer sides parallel to the scanning direction) and the case of B5 width and B6 length. Accordingly, the set direction of the original is determined only by the result of detection of the original length. Only for the above mentioned cases, the set direction is determined based on the result of detection of the original in the transverse direction. Accordingly, if the result of detection in the transverse direction indicates presence of the original in the above mentioned cases, the set direction is widthwise (A4 or B5), and it the result indicates absence of the original, the set direction is lengthwise (A5 or B6).

Then, in step 73, the scanning request is set to 0 to return to the scanner 31 and the length state is updated to 4 in step 74.

When the length state is 4, it is determined in step 81 whether the scanner 31 returns to the home position or not. If the scanner 31 returns to the home position, the length state and the width state are both set to 0 in step 82 and the program returns to the main routine.

Next, processing starting with step 90 for detection of the original in the transverse direction will be described.

In step 90, the content of the width state is checked and if the width state is any of 1 to 3, branching is effected to any of steps 91, 101 and 111.

When the APS mode or AMS mode is selected, the width state is 1 and accordingly processing starting with step 91 is executed.

When the manual mode is selected, the width state is 0 and accordingly the program returns to the main routine without executing the above mentioned steps.

When the width state is 1, it is first determined in step 91 whether the reference signal is outputted as a result of operation of the reference position sensor 50. If the reference signal is outputted, a third counter for defining an interval of measurement , a fourth counter for counting the number of measurements, and a fifth counter for counting the number of determinations of presence of the original based on the measurement results are cleared in step 92.

In step 93, the width memory for storing the detection result in the transverse direction is cleared and the width state is updated to 2 in step 94.

When the width state is 2, the third counter for defining the intervals of measurements is incremented and and it is determined in step 102 whether the content of the third counter attains a predetermined value or not.

If it does not attain the predetermined value, the program returns to the main routine. If it attains the predetermined value, processing starting with step 103 is executed.

In step 103, the fourth counter is incremented and the third counter is cleared. Thus, processing starting with step 102 is executed for each predetermined cycle.

In step 104, the count value of the fourth counter is checked, that is, it is determined whether the measurement is effected by a predetermined number of times or not. If the number of measurements is smaller than the predetermined number, the program proceeds to step 105 to determine presence or absence of the original based on the signal from the second sensor 52. If the original exists, the fifth counter is incremented in step 106. If the original does not exist, the step 106 is bypassed.

Thus, the fifth counter counts the number of determinations of presence of the original.

If measurements are effected by the predetermined number of times (in the case of NO in step 104), the width state is updated to 3 in step 107 and the program returns to the main routine.

If the width state is 3, the fifth counter is checked in step 111 to determine whether the number of determinations of presence of the original is larger than the predetermined number or not. If it is larger than the predetermined number, the width memory is set to 1 (indicating presence of the original) in step 111. If it does not attain predetermined number, the step 112 is bypassed. Finally, the width state is updated to 4 in step 113 and the program returns to the main routine.

If the width state is 4, the program immediately returns to the main routine.

According to the above described embodiment, the length of the original can be detected by the first sensor 51, even if absence of the original is determined during detection of the original size due to change in intensity of light dependent on the pattern or density of the original, such erroneous determination is not taken into into account. More specifically, the length of the original is correctly detected without being erroneously determined to be shorter than the actual length.

In addition, by determining presence or absence of the original in the transverse direction by the second sensor 52, it is made possible to detect easily the set direction of the original.

Based on the results of determination of the length of the original and the set direction thereof, the original size and the set direction can be detected correctly.

The length of the original D can be detected at the time of scanning for a predetermined period after the scanning of the length of the original D. Accordingly, if the length of the original D is short, the scanner 31 does not need to effect full scanning over the whole length of the platen glass 16 and it becomes possible to detect the original size for a short time and to suppress lowering of the first copy speed of the copying apparatus.

Simultaneously with the start of scanning of the scanner 31, the exposure lamp 11*a* is turned on, whereby the detection of the original size is started. Thus, it is not needed to wait for the rise time of the exposure lamp 11*a* for the original size detection operation and the first copy speed is increased accordingly.

In addition, even if absence of the original is determined during the detection of the original size, the position in which the absence of the original is finally detected is the rear edge position of the original. Accordingly, even if the rise of irradiation of the exposure lamp 11*a* is completed during the scanning of the scanner 31, the rise is already completed before the scanner 31 reaches the rear edge position of the original of the minimum detectable size and, consequently, no inconvenience is caused in the original size detection operation.

In the above described embodiment, the first and second sensors 51 and 52 are provided near the lens 14 so as to receive light reflected from the original D irradiated by the light source 11*a* and to scan the original D in the longitudinal direction through the movement of the scanner 31 having the light source 11*a*. However, the first and second sensors 51 and 52 may be attached to the scanner 31. The first and second sensors 51 and 52 may be driven by other drive means than the scanner 31. The scanner 31, the first and second sensors 51 and 52 and the like may be fixed and the platen glass 16 together with the original D may be moved.

In the above described embodiment, the first to fifth counters for detecting the original size, the comparing means and the determining means are implemented by means of software using the programs in the CPU 201. However, they may be implemented by hard logics and the like.

According to the above described embodiment of the invention, the original size can be detected correctly and there is no need to wait for the rise time of the optical system for the original size detection operation. Consequently, lowering of the first copy speed can be prevented effectively.

FIGS. 11 through 18A to 18D show another embodiment of the invention.

Figure 11:
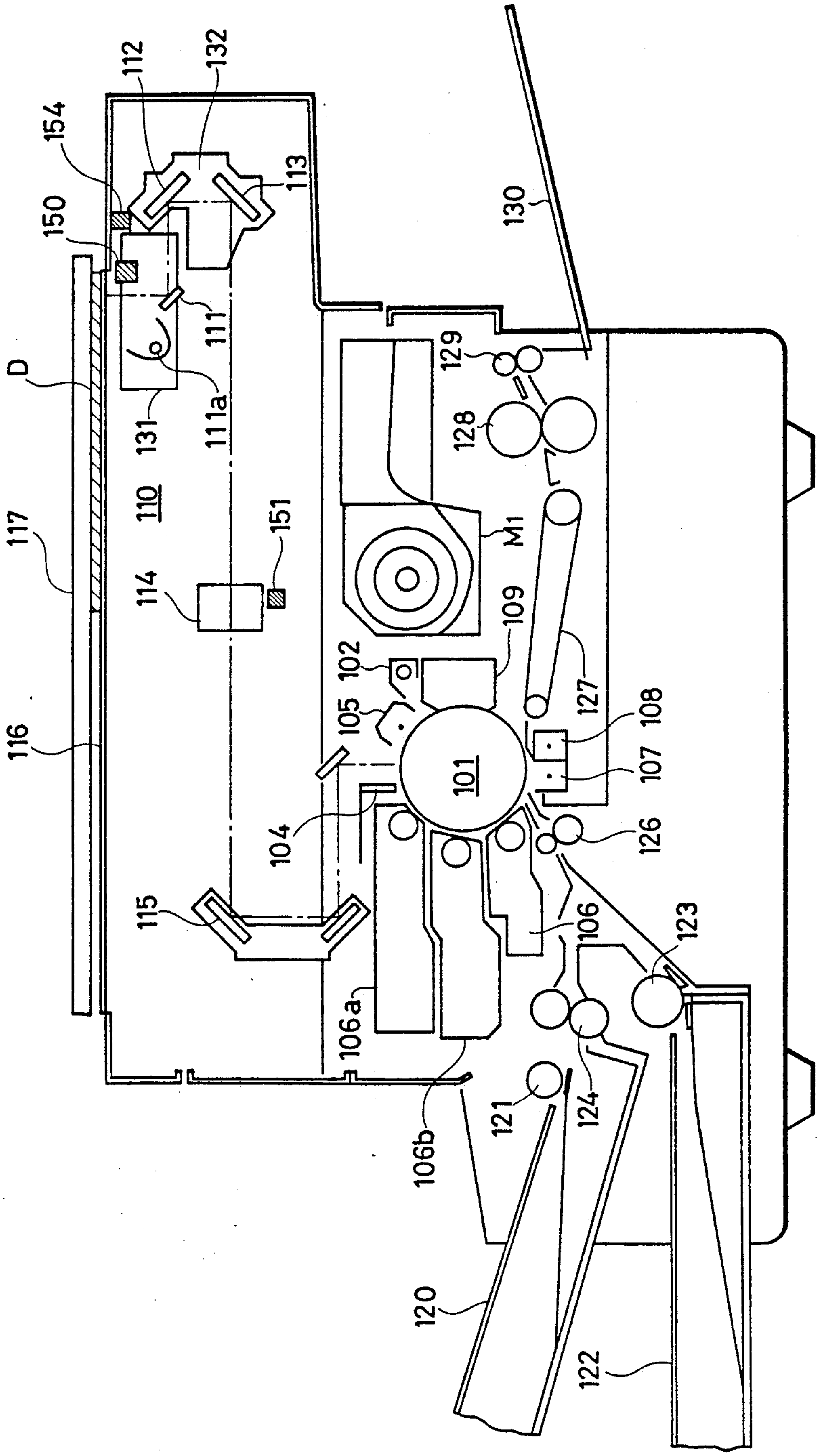
FIG. 11 is a front sectional view showing schematically a construction of a copying apparatus according to another embodiment of the present invention.

FIG. 11 is a front sectional view showing schematically a construction of the copying apparatus.

A photoconductive drum 101 rotatable counterclockwise is provided nearly at the center of the main body of the copying apparatus. A main eraser lamp 102, an LED array 104, a corona charger 105, developing units 106*a*, 106*b* and 106*c*, a transfer charger 107, a separation charger 108, and a cleaning device 109 of a blade type are provided around the photoconductive drum 101. The photoconductive drum 101 has its surface provided with a photoconductive layer. When the drum 101 passes along the eraser lamp 102 and the corona charger 105, its surface is uniformly charged and then exposed to an image from an optical system 110.

The optical system 110 is provided under a platen glass 116 to scan an image of an original D. It comprises a light source 111*a*, movable mirrors 111, 112 and 113, a lens 114, and a mirror 115. A scanner 131 comprising the light source 111*a* and the movable mirror 111 moves at a speed v/n (n being a copying magnification) with respect to a rotating speed v of the photoconductive drum 101 and a slider 132 comprising the movable mirrors 112 and 113 is driven by a scan motor so as to move at a speed v/2n.

An original cover 117 has a lower surface, which serves to press the original D, and it is colored in yellow to make it easy to optically detect presence/absence of the original D.

There are provided, under the platen glass 116, an original edge switch 150 which turns on and off according to movement of the scanner 131, a home position switch 154 for detecting the home position of the scanner 131, and switch groups not shown. The original edge switch 150 detects the leading edge position of the original D at the time of scanning the original D or reading the original size, whereby a reference signal is outputted.

A photosensor 151 for receiving light emitted from the exposure lamp 111*a* and reflected from the original D and detecting presence or absence of the original at a specified position in the longitudinal direction of the original D (namely, the scanning direction of the scanner 131) is provided near the lens 114. The sensor 151 is arranged to receive the light reflected from the original D during preliminary scanning of the scanner 131, with respect to originals of all regular sizes to be placed on the platen glass 116.

More specifically, in the case of a copying apparatus which sets the original D to a central position of the platen glass 116 in the transverse direction, the photosensor 151 is located for sensing the center in the transverse direction of the platen glass 116, so that it receives light reflected from the central position of the original D by preliminary scanning of the scanner 131.

The photosensor 151 has a blue color transmitting filter. Consequently, the sensitivity to the reflected light from the original cover 117 in yellow color is lowered, making it easy to optically detect the original D.

On the other hand, on the left side of the main body of the copying apparatus, there are upper feed portion 120 and a lower feed portion 122 provided with feed rollers 121 and 123, respectively. Copy paper fed from either feed portion moves through a transport path including a roller pair 124, a timing roller pair 126, a transport belt 127, a fixing device 128 and a discharge roller 129. During this movement, an image on the photoconductor drum 101 is transferred onto the copy paper and fixed by the fixing device 128 and the copy paper is discharged onto the discharge tray 130.

Figure 12:
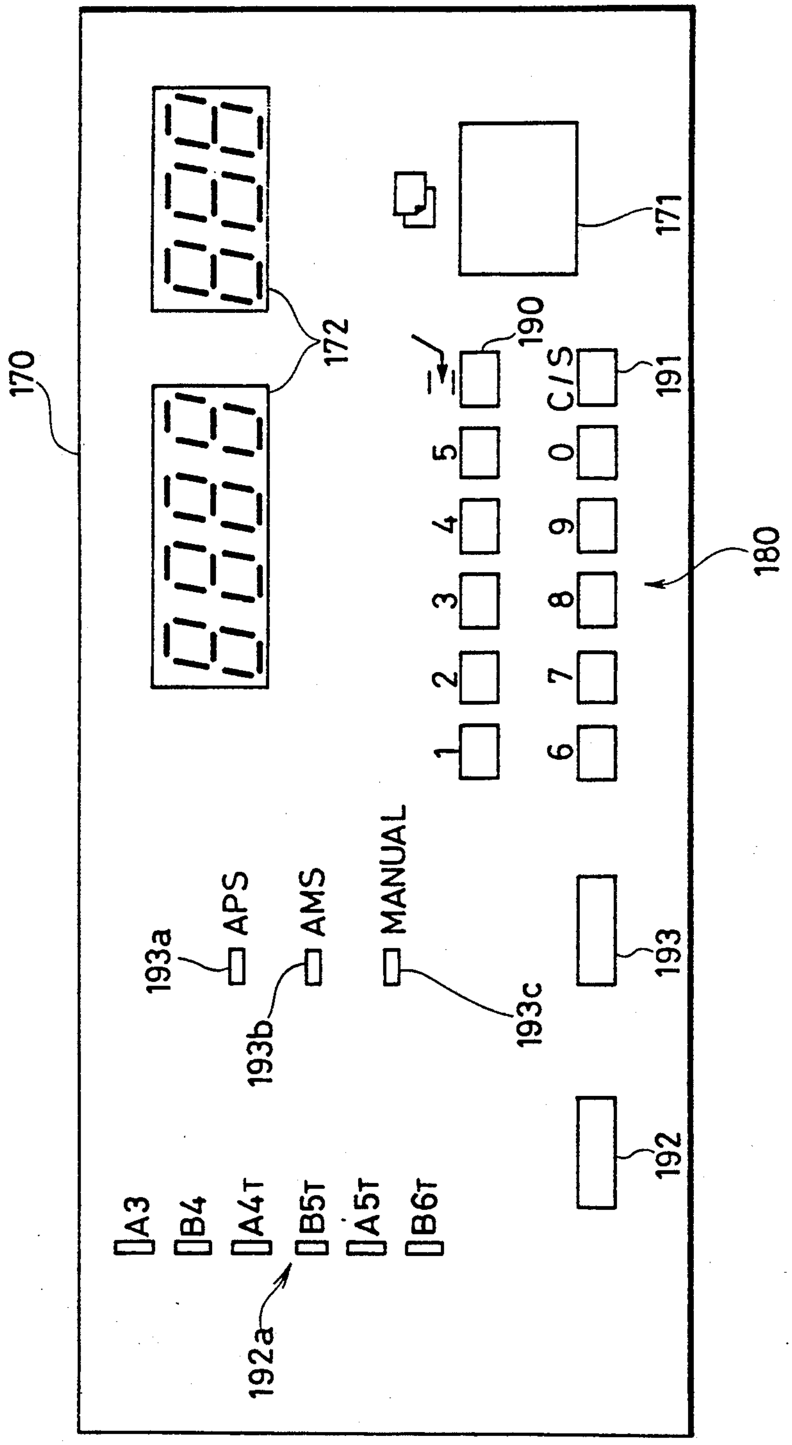
FIG. 12 is a plan view of an operation panel provided on the upper surface of the copying apparatus of FIG. 11.

FIG. 12 is a plan view of an operation panel 170 provided on the upper surface of the copying apparatus.

The operation panel 170 comprises; a print start key 171 for starting copy operation; display portions 172 formed by 7-segment LEDs or the like on which the number of copies and other information are displayed; ten-key pads 80 including ten numerical value from 0 to 9 for inputting the number of copies and the like; an interruption key 190 for designating interruption copy; a clear stop key 191; a paper selection key 192 for designating any of copy paper sheets in paper feed cassettes attached in multiple stages according to the size and the longitudinal or transverse direction; paper display elements 192*a* for displaying the size and the longitudinal or transverse direction of the selected copy paper; a mode switching key 193 for successively switching among an automatic paper selection mode, an automatic magnification selection mode and a manual mode; mode display elements 193*a*, to 193*c* for displaying the selected mode, etc. In addition, though not shown, the operation panel 170 comprises an upkey and a downkey for changing and setting the density of a copy image by steps; a density display portion for displaying the set density; a magnification setting key for manually setting a copying magnification; a magnification display portion for displaying the set magnification, etc.

Figure 13:
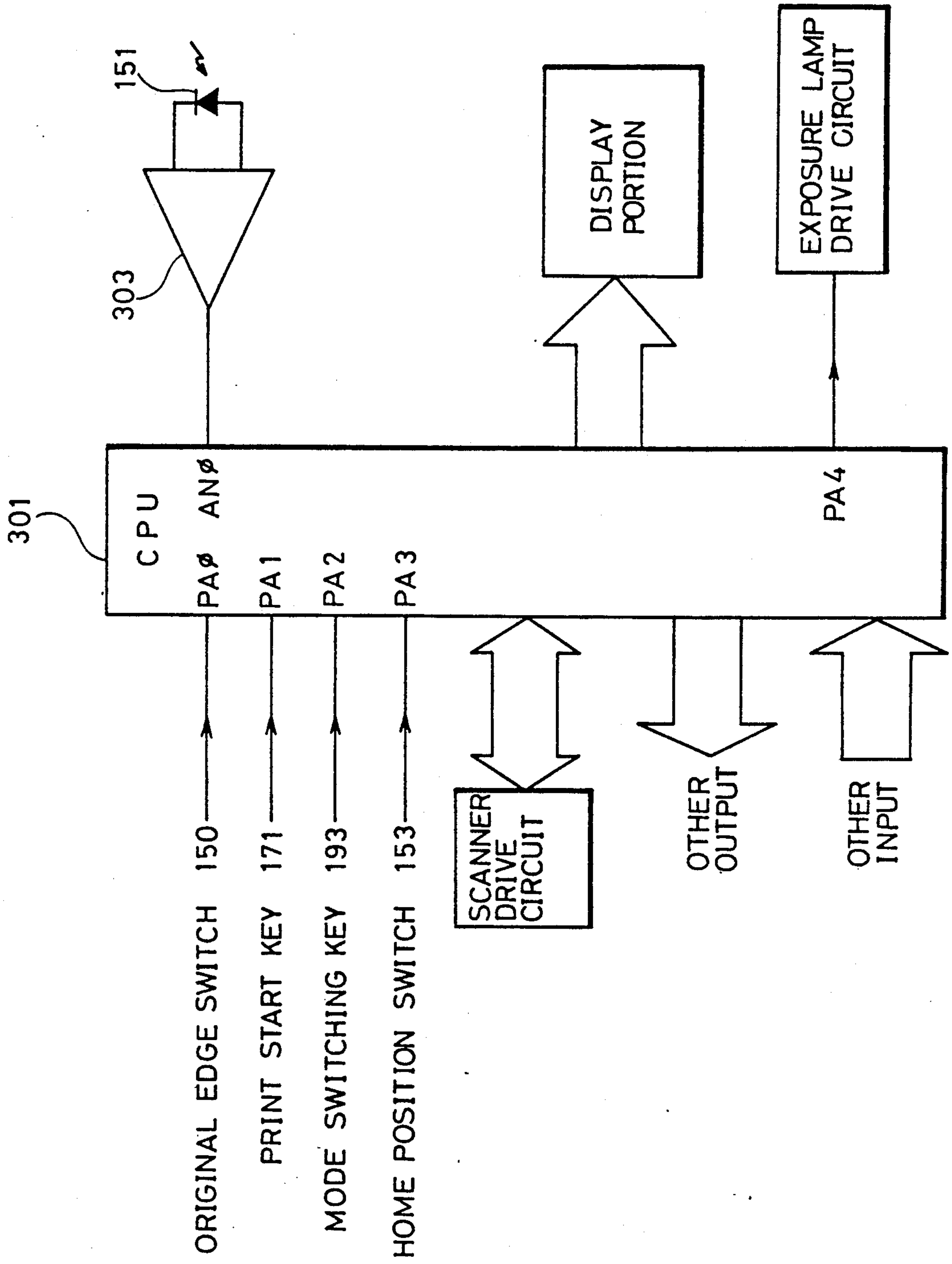
FIG. 13 is a circuit diagram showing a control circuit of the copying apparatus according to the embodiment of FIG. 11.

FIG. 13 is a circuit diagram showing a control circuit of the copying apparatus.

An analog input terminal AN0 of a CPU 201 formed by a microcomputer is connected with an amplifier 303 for amplifying the output of the sensor 151, and various keys as described above, display elements and drive circuits of motors and clutches and the like are connected to the other input terminals of the CPU 201.

An output terminal PA4 is connected to an exposure lamp drive circuit for turning on and off the exposure 111*a*.

In this embodiment, preliminary scanning in which the scanner 131 moves while irradiating the original D is effected to detect the size of the original D before exposure scanning for copy operation by the scanner 31.

During the preliminary scanning, light reflected from the original D is applied to the photosensor 151. The sensor 151 outputs a signal according to intensity of the received light and the signal is amplified by the amplifier 303 and then inputted to the CPU 301.

The CPU 301 digitally converts the signal inputted from the amplifier 303 and detects the size of the original D by a program stored in the CPU 301, based on the data thus obtained and it executes control according to the original size.

The original edge switch 150 is used to detect a leading edge of an image in copy operation and to obtain a reference signal serving as a reference point for measurement of the original length in preliminary scanning for detection of the original size.

Figure 14:
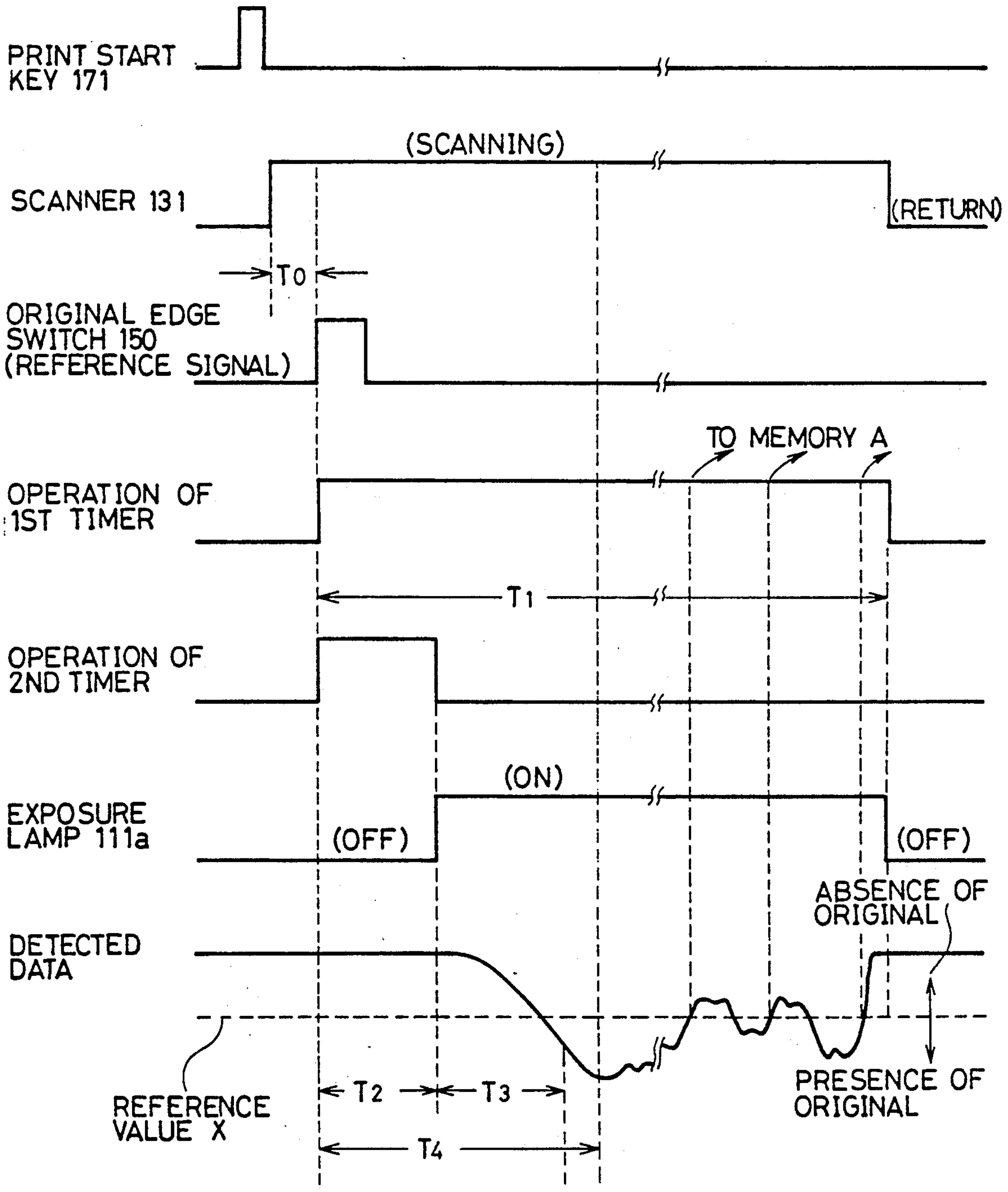
FIG. 14 is a timing chart showing signal conditions when an original size is detected by preliminary scanning according to the embodiment of FIG. 11.

FIG. 14 is a timing chart showing signal conditions for detecting the original size by preliminary scanning.

Referring to FIG. 14, original size detecting operation will be described.

When an on-edge of the print start key 171 is detected, preliminary scanning is started and the scanner 131 starts to move from the home position at a prescribed speed in the scanning direction.

When the scanner 131 arrives just below the leading edge position of the original D after an elapse of a time T0 from the start of the scanning, the scanner 131 operates the original edge switch 150 and the reference signal is outputted from the original edge switch 150.

With the timing of output of the reference signal, the CPU 301 starts the first timer for defining a scanning time T1 of the scanner 131 and the second timer for defining irradiation start timing of the exposure lamp 111a. The time T1 required for scanning the original of the maximum detectable size is set in the first timer. At this time, the exposure lamp 111a is off.

The first and second timers exist in the CPU 301 and after they start counting, they count up for each cycle and update state values representing the passage of the time.

The CPU 301 stops the counting of the second timer when the state value of the second timer becomes equal to a delay time T2 and executes irradiation processing for the exposure lamp 111a.

The delay time T2 is set by taking account of a rise time T3 required for an irradiation amount of the exposure lamp 111a to attain a prescribed amount from its turn-on.

More specifically, the delay time T2 is set so that a time obtained by addition of the rise time T3 to the delay time T2 is shorter than a time T4 required for the scanner 131 to scan an area between the leading and rear edges of the original of the minimum size detectable.

More specifically, assuming that the rise time T3 of the exposure lamp 111a is 0.5 second, that the scanning speed of the scanner 131 is 110 mm/sec. and that the minimum original size detectable is a postal card size (100 mm×148 mm) arranged lengthwise along the scanning direction, the delay time T2 is about 0.8 sec. or less.

Thus, independent of the state of the exposure lamp 111a having the irradiation start timing controlled as described above, the CPU 301 samples the signal from the photosensor 151 and digitally converts it as detection data, so that the detection data is compared with a prescribed reference value x. If the data is larger than the reference value x, it is determined that no original exists, and, in the reverse case, it is determined that an original exists.

When the determination of the CPU 310 changes from presence of an original to absence of an original, the state value of the first timer at that time is stored in a memory A contained in the CPU 301. The content of the memory A is renewed each time the determination changes from presence of an original to absence to an original and therefore the newest value is stored therein.

More specifically, even if absence of an original is temporarily determined in spite of presence of the original D in cases in which the light emitted from the exposure lamp 111a does not reach the prescribed value, or in which the signal from the photosensor 151 changes due to the pattern or density of the original D, the state value of the first timer at the time of the next change of the detection data to absence of an original is stored in the memory A.

When the measurement of the time T1 by the first timer is terminated, the CPU 301 instructs the respective drive circuits to turn off the exposure lamp 111a and to return the scanner 131 to the home position. Then, the length of the original is determined based on the state value stored finally in the memory A.

Thus, the original length is determined based on the state value of the first timer at the time of determining absence of an original finally and a correct original size (such as A6, B5, A4, B4 or A3 size) is detected without erroneous determination that the original lengths is shorter than the actual length.

As described above, the scanner 131 starts scanning immediately after the turn-on of the print start key 171 without waiting for the rise of the exposure lamp 111a and accordingly the time required for detection of the original size can be reduced, making it possible to increase the rising speed (the first copy speed) of the copying apparatus.

Referring now to flow charts of FIGS. 15 to 18D, the operation of the CPU301 functioning as the original size detecting means and the irradiation control means will be described.

Figure 15:
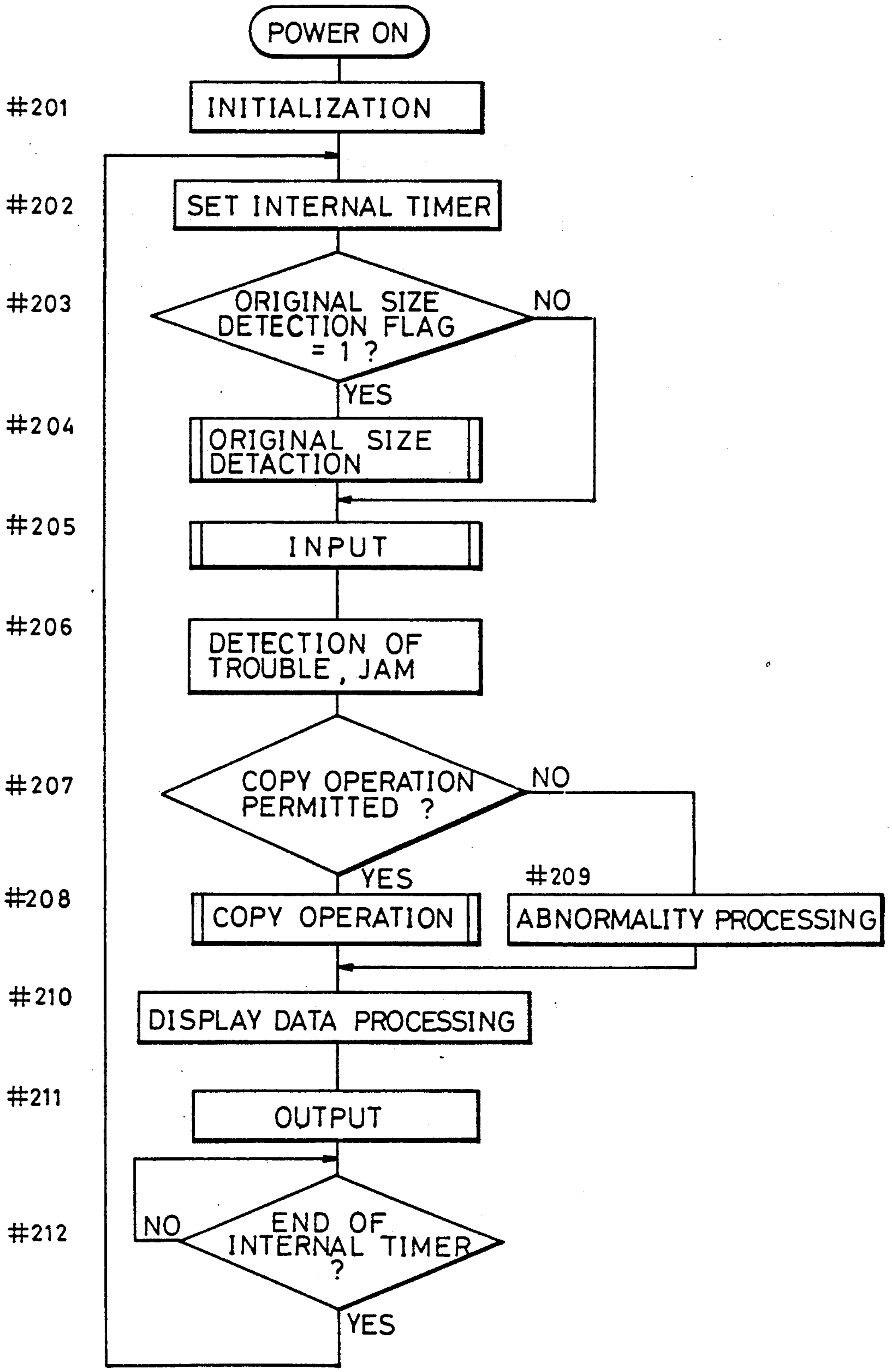
FIG. 15 is a flow chart showing a main routine of a CPU 201 according to the embodiment of FIG. 11.

FIG. 15 is a main flow chart showing general operation of the copying apparatus.

In step 201, initialization is effected to set the CPU 301 to the initial state and to set the copying apparatus to the initial mode after turn-on of the power supply.

In step 202, an internal timer for defining a period of one routine is set. Thus, procedures of steps 203 to 212 are carried out for each predetermined time.

In step 203, an input routine to be described later (in step 205) is executed to determine whether an original size detection flag indicating the necessity of detecting the original size is set or not.

If the original size detection flag is reset to 0, this means that the manual mode is set and the processing flow proceeds to step 205 without carrying out the original size detection.

If the original size detection flag is set to 1, an original size detection routine is executed in step 204 according to the present invention. This subroutine will be described afterwards.

In step 205, the input routine is executed to input signals from various keys on the operation panel 170, the original edge switch 150, the photosensor 151, the home position switch 154 and other switches or sensors not shown.

In step 206, operation conditions of the copying apparatus such as occurrence of any trouble or paper jam are detected based on the input results of step 205. Based on the result of the detection, it is determined in step 207 whether copy operation is permitted or not.

If copy operation is permitted, a copy operation routine is executed in step 208. If it is not permitted, an abnormality processing routine is executed in step 209.

In step 210, data displayed on the respective display portions of the operation panel 170 are processed and in step 211, the data are displayed or signals for controlling the respective components of the copying apparatus are outputted.

After the above mentioned procedures have been executed, there is a wait for an end of the previously set internal timer in step 212 and then the processing flow returns to step 202. Thus, the period of one main routine can be maintained constant.

While the power supply is in the on state, the procedures of steps 202 to 212 are executed repeatedly.

Figure 16A:
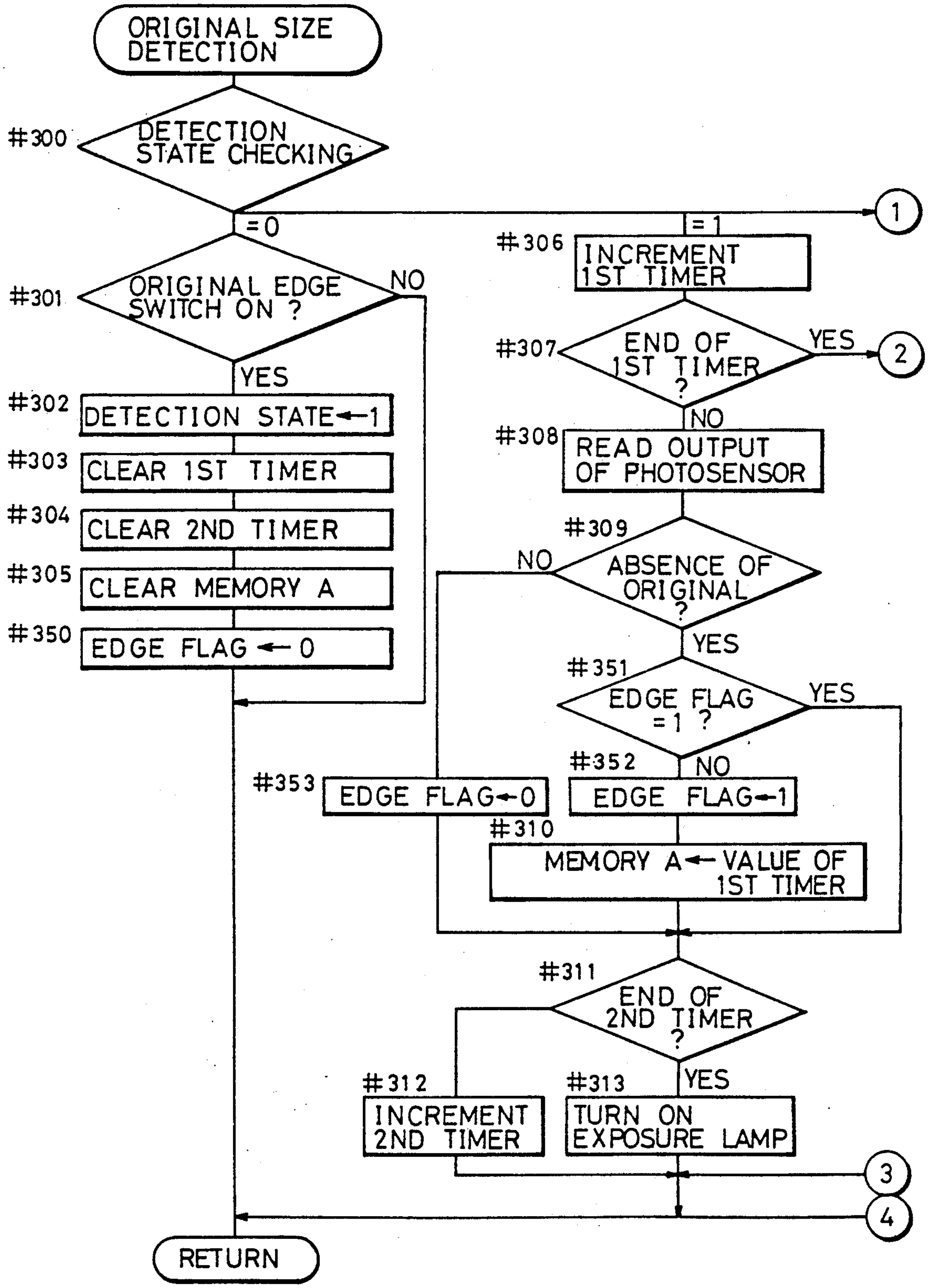
FIGS. 16A and 16B are flow charts showing detailed procedures of the original size detecting routine in FIG. 15.
Figure 16B:
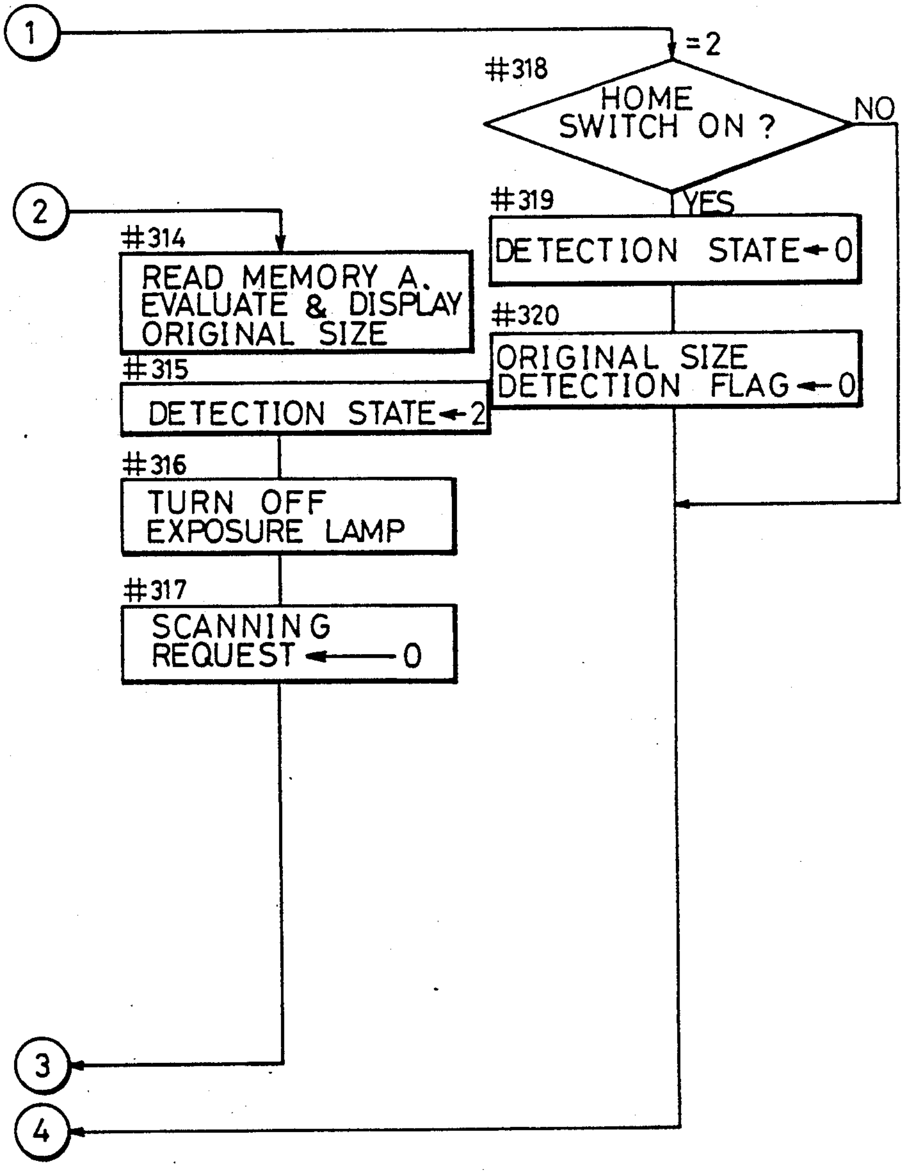

FIGS. 16A and 16B are flow charts of the original size detection routine in the above mentioned step 204.

First, in step 300, a detection state is determined. The detection state represents any of advancing conditions of the original size detection processing and values 0 to 2 are set for the detection state. According to the set value, the processing flow branches to any of steps 301, 306 and 318.

If the detection state is 0 indicating the initial state in the original size detection routine, the processing flow proceeds to step 301.

In step 301, it is determined whether the original edge switch 150 is turned on or not as a result of movement of the scanner 131 to the leading edge position in the preliminary scanning started by pressing of the print start key 171, that is, whether the reference signal is outputted or not.

In the case of NO in step 301, the processing flow returns and there is a wait for turn-on of the original edge switch 150.

In the case of YES in step 301, the procedures of steps 302 to 305 and 350 are executed successively.

In step 302, the detection state is set to 1 and, in step 303, the first timer for defining the end timing of the preliminary scanning is cleared.

In step 304, the second timer for defining the turn-on timing of the exposure lamp 111*a* is cleared and, in step 305, the memory A which stores the state value of the first timer is cleared. In step 350, the edge flag is reset to 0.

Thus, the initialization processing of the original size detecting operation is executed in steps 303 to 305 and 350.

If the detection state is 1 in step 300, procedures starting with step 306 are executed.

In step 306, the first timer is incremented. Then, in step 307, it is determined whether the state value of the first timer reaches a prescribed value representing the time T1, that is, whether the first timer comes to an end or not. If the first timer does not come to the end, the processing flow proceeds to step 308.

The time T1 defines the scanning time for original size detection and it is normally set to a value which corresponds to the time required for scanning between the leading and rear edges of the original of the maximum regular size, plus some allowance. Accordingly, the determination NO in step 307 means that the scanner 131 is in scanning operation.

In step 308, a signal from the photosensor 151 inputted to the analog input port AN0 of the CPU 301 is read and it is digitally converted to detection data.

In step 309, the detection data is compared with the reference value x so that presence or absence of the original is determined.

In the case of YES in step 309, that is, in the case in which absence of an original is determined, it is determined in step 351 whether the edge flag is 1 or not. If the edge flag is 1, which does not mean the edge of change from presence of the original to absence of the original, the processing flow jumps to step 311. If the edge flag is 0, the edge flag is set to 1 in step 352 and, then in step 310, the state value of the first timer at that time is stored in the memory A contained in the CPU 301. In the case of NO in step 309, the edge flag is reset to 0 in step 353 and the processing flow jumps to step 311.

Thus, the content of the memory A is renewed each time the step 311 is executed. In consequence, only the value of the first timer at the time of the newest determination of change from presence of the original to absence of the original during one preliminary scanning is stored in the memory A.

In step 311, it is determined whether the second timer comes to an end or not. If the second timer does not come to the end, the second timer is incremented in step 312 and the processing flow returns.

In the case of YES in step 311, the exposure lamp 111*a* is turned on in step 313 and then the processing flow returns.

On the other hand, in the case of YES in step 307, the processing flow proceeds to step 314. Then, the content of the memory A is read and the original size is evaluated based on the read value, so that it is displayed.

Subsequently in step 315, the detection state is set to 2 and the exposure lamp 111*a* is turned off in step 316. In step 317, the scanning request flag is reset to 0 and the processing flow returns.

If it is determined in the above mentioned step 300 that the detection state is 2, the procedures of steps 318 to 320 are executed.

More specifically, in step 318, it is determined based on the signal from the above mentioned home position switch 154 whether the scanner 131 is returned to the home position or not. If the scanner 131 is not returned to the home position, the processing flow returns and there is a wait for the return of the scanner 131.

When the scanner 131 returns to the home position, the detection state is reset to 0 in step 319. The original size detection flag is reset to 0 in step 320 to terminate the original size detection routine and then the processing flow returns to the main routine.

Figure 17:
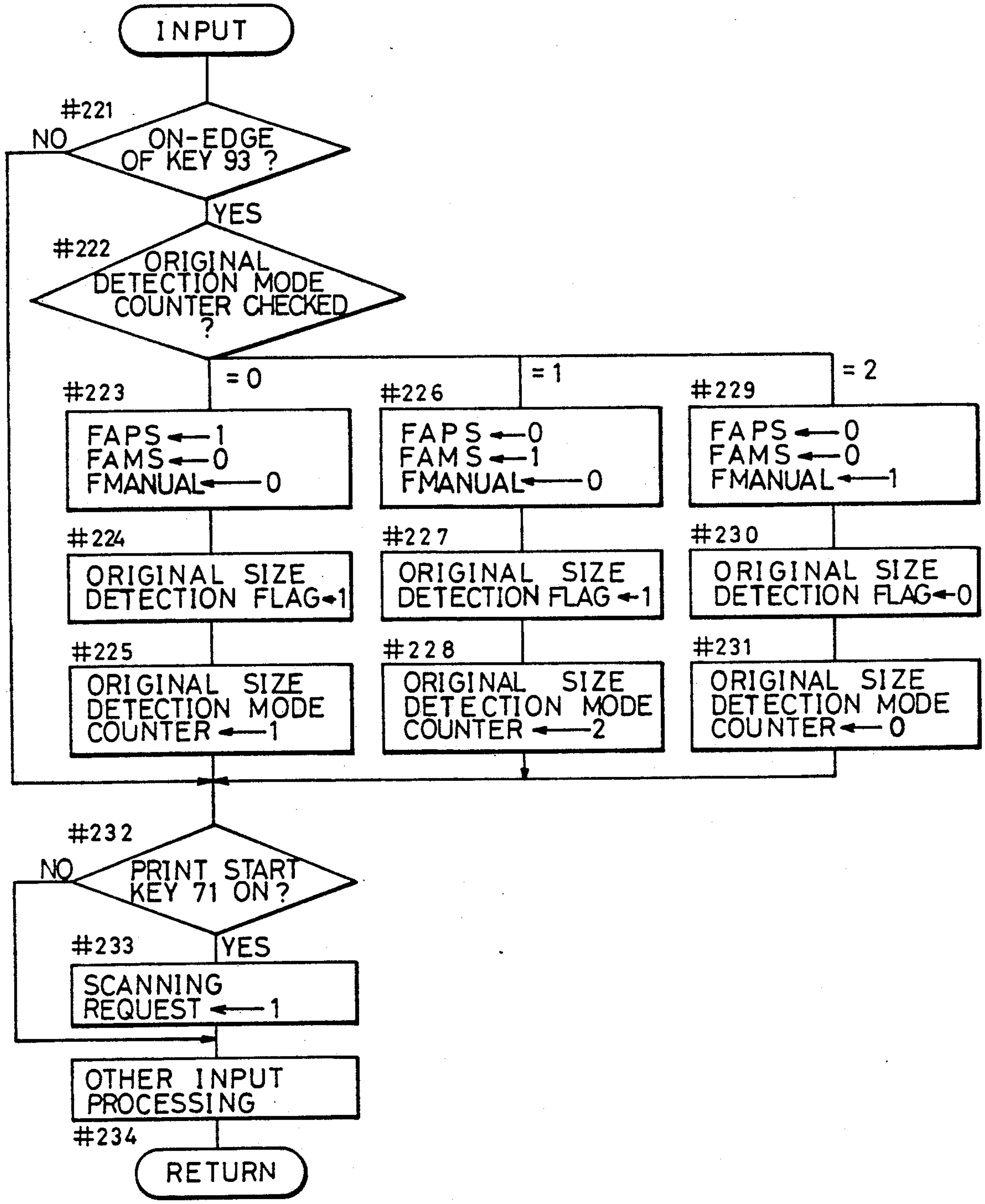
FIG. 17 is a flow chart showing detailed procedures of the input routine in FIG. 15.
Figure 18A:
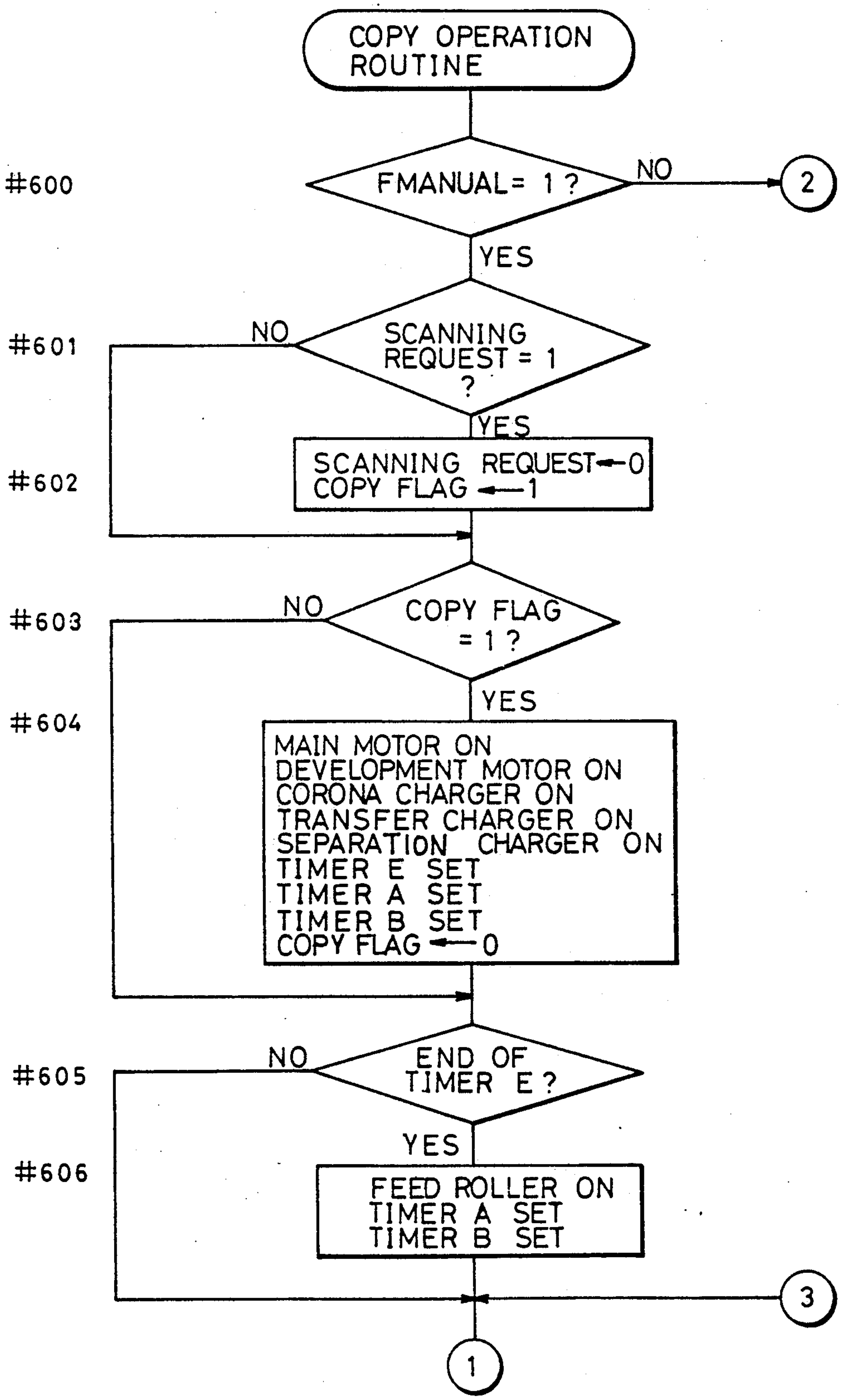
FIGS. 18A to 18D are flow charts showing detailed procedures of the copy operation routine in FIG. 15.
Figure 18B:
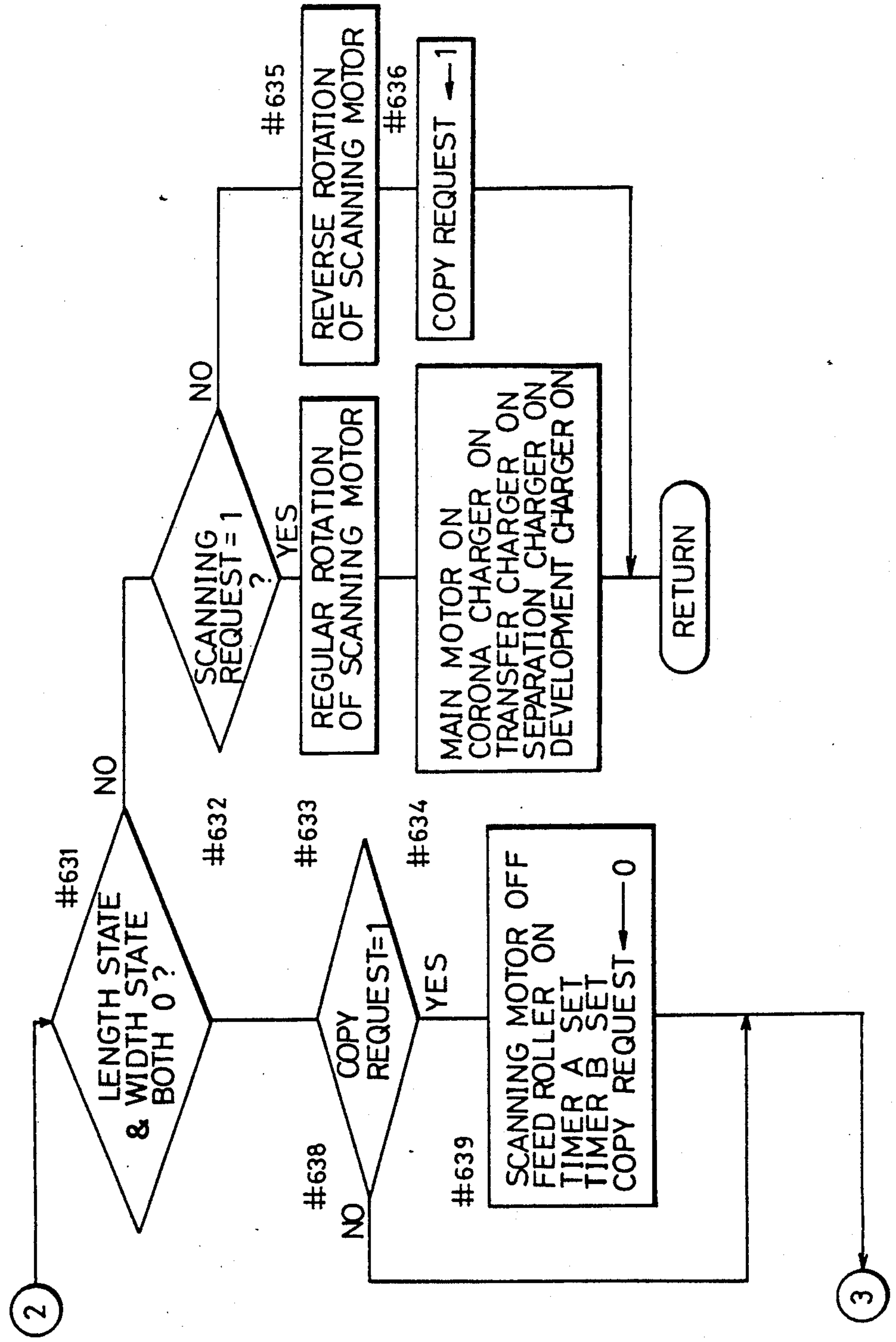
Figure 18C:
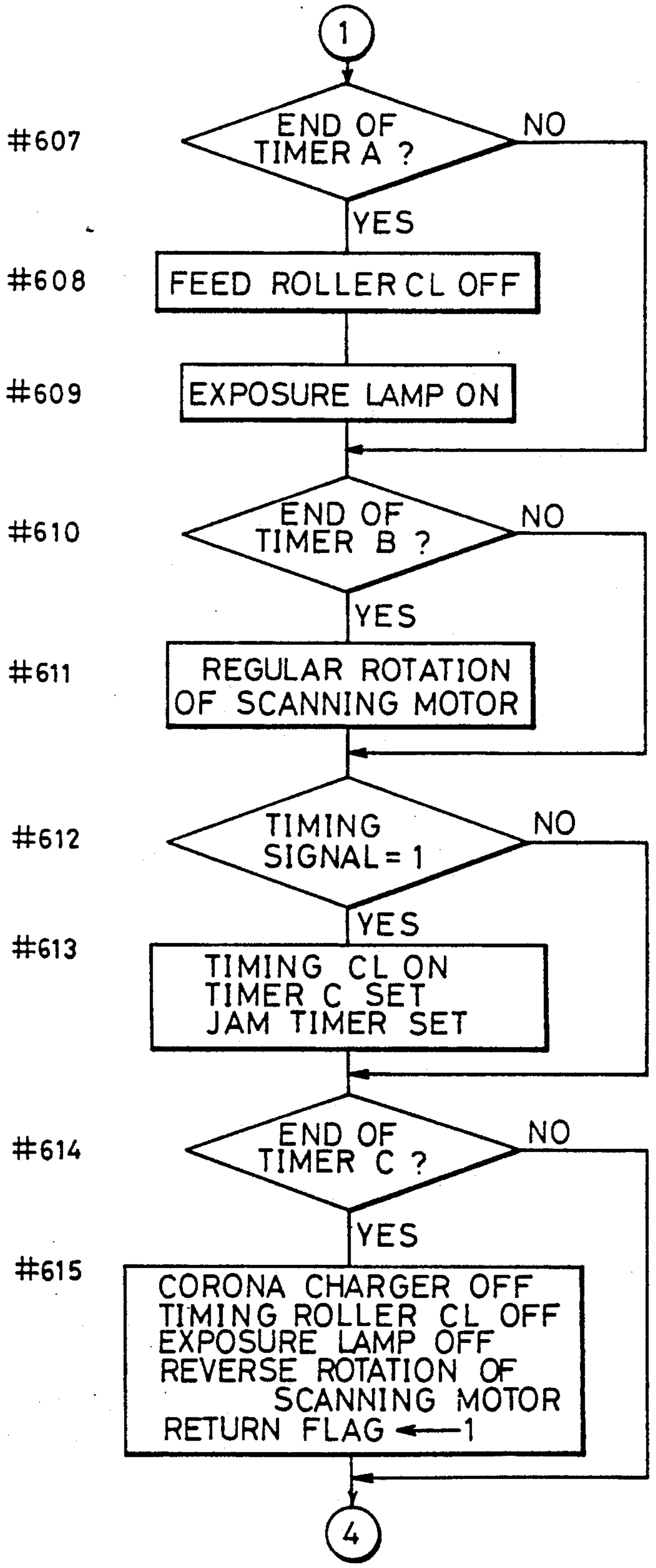
Figure 18D:
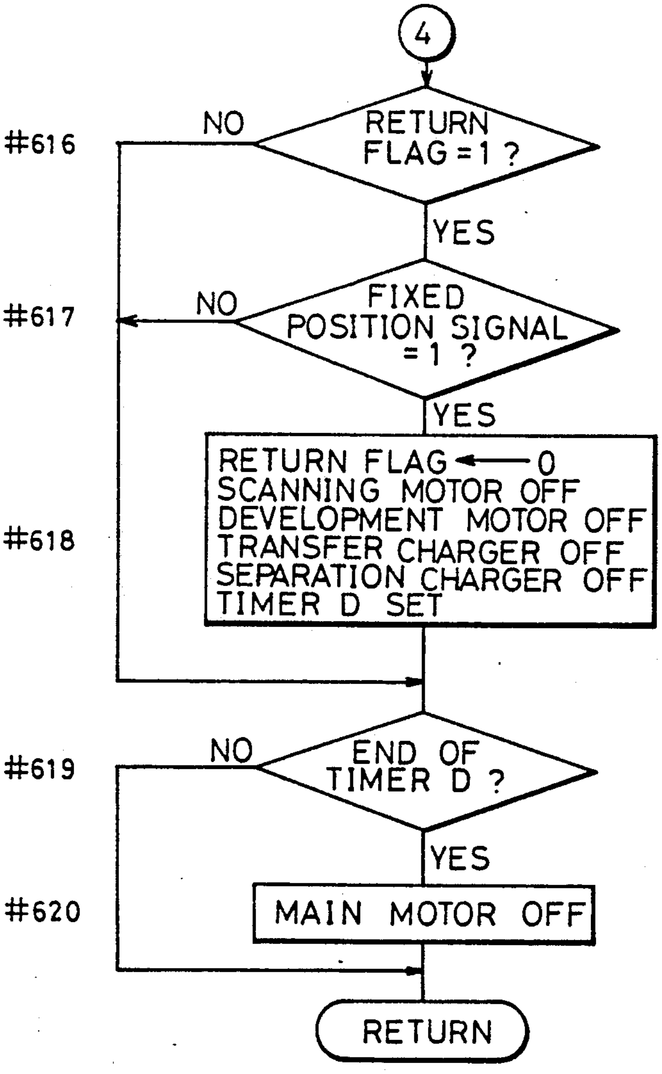

FIG. 17 is a flow chart of the input routine of the above mentioned step 205.

In step 221, it is determined based on the on-edge of the mode switching key 193 whether the key is pressed or not. If it is pressed, procedures starting from step 220 are executed.

In step 222, the content of the original size detection mode counter is checked and a detection mode is selected according to the content.

The detection modes include three modes, namely, an automatic paper selection mode (APS mode) based on the result of the detection of the original size, an automatic magnification selection mode (AMS mode) for setting a copying magnification based on the result of the original size detection and a preset size of paper, and a manual mode for manually selecting a paper size and setting a copying magnification without original size detection. When any of the detection modes is selected, it is displayed on the corresponding one of the mode display elements 193*a* to 193*c*.

In the APS mode, the flag FAPS indicating the APS mode is set to 1 and the flags FAMS and FMANUAL indicating the other detection modes are reset to 0 (in step 223). The original size detection flag is set to 1 to execute original size detection procedures (in step 224) and the content of the original size detection mode counter is set to 1 (in step 225).

In the AMS mode, the flag FAMS indicating the AMS mode is set to 1 and the flags showing the other detection modes are reset to 0 (in step 226). The original size detection flag is set to 1 (in step 227) and the content of the original size detection mode counter is set to 2 (in step 228).

In the manual mode, the flag FMANUAL indicating the manual mode is set to 1 and the flag indicating the other detection modes are reset to 0 (in step 229). The original size detection flag is reset to 0 (in step 230) and the content of the original size detection mode counter is reset to 0 (in step 231).

In the above described procedures, each time the mode switching key 193 is pressed, switching is effected in a rotating order of the APS mode, the AMS mode, the manual mode, the APS mode etc.

In step 232, it is determined whether the print start key 171 is pressed or not. If it is pressed, the scanning request flag is set to 1 and control according to the above described detection mode is started.

In step 234, signals from other keys on the operation panel 170, other sensors located in the copying apparatus and the like are inputted.

FIGS. 18A to 18D are flow charts of the copy operation routine of step 208 shown in FIG. 15.

First, in step 600, it is determined whether the flag FMANUAL is 1 or not in order to determine whether the mode for original size detection is set or not.

If the flag FMANUAL is 1, the manual mode is selected and it is not necessary to detect the original size. Accordingly, procedures starting from step 601 are executed to effect normal copy operation.

The steps 601 to 604 relate to procedures from the turn-on of the print start key 171 to the preliminary processing for image formation. First, in step 601, it is determined whether the scanning request flag is set to 1 or not. If the flag is set, the flag is reset in step 602 and the copy flag is set. If the copy flag is 1 (YES in step 603), the main motor, the development motor, the corona charger 105, the transfer charger 107 and the separation charger 108 are turned on for the preliminary processing. Further, a timer E for defining a preliminary processing time, a timer A for defining the on time of the feed roller, and a timer B for defining the time until the start of scanning for waiting for a rise of the exposure lamp 111*a* are set appropriately and then the copy flag is reset.

When the timer E comes to an end in step 605, the feed roller of the upper feed portion 120 or the lower feed portion 122 is turned on in step 606.

If the set time of the timer A is terminated in step 607, the feed roller clutch is turned off (in step 608) and the exposure lamp 11*a* is turned on (in step 609).

If the set time of the timer B is terminated in step 610, the scanning motor is rotated in the regular direction (in step 611), thereby starting the scanning of the optical system 10 including the scanner 131.

If the timing signal is 1 in step 612, the clutch of the timing roller pair 126 is turned on in step 613 and the timer C for defining the on time is set, and then the jam timer is set.

If the set time of the timer C is terminated in step 614, the corona charger 105, the exposure lamp 111*a* and the clutch of the timing roller pair 126 are turned off in step 615. Then the scanning motor is rotated in the reverse direction and a return flag indicating return operation of the optical system 110 is set.

Then, if the return flag is 1 in step 616, this means that the optical system 110 is in return operation and accordingly there is a wait in step 617 until the optical system 110 returns to the home position, that is, until the fixed position signal changes to 1.

When the optical system 110 returns to the home position, the home position switch 154 is turned on and the home position signal is 1 . Accordingly, in step 618, the return flag is reset and the scan motor is stopped. Further, the development motor, the transfer charger 117 and the separation charger 108 are turned off and the timer D for stopping the main motor is set.

If the set time of the timer D is terminated in step 619, the main motor is stopped in step 620 and the copy operation is terminated.

On the other hand, in the case of NO in the above mentioned step 600, that is, if the flag FMANUAL is 0, procedures starting from step 631 are executed to detect the original size.

In step 631, it is determined whether the length state and the width state are both 0 or not.

The length state and the width state serve to control original size detection and, during the detection, any of 1 to 4 is maintained dependent on the state at that time. Those states are reset to 0 in two cases, namely, in the case of the manual mode where original size detection is not effected and in the case in which the optical system 111 returns to the home position after original size detection.

If NO is determined in step 631, presence or absence of a scanning request is checked in step 632. If the scanning request is issued, the scanning motor is rotated in the regular direction to effect scanning. Then in step 634, the main motor, the motor for the development unit, the corona charger 105, the transfer charger 107 and the separation charger 108 are turned on.

At that time, the scanner 131 of the optical system 110 starts to move in the off state of the exposure lamp 111*a*. However, it takes time for the scanner 131 to reach the rear edge position of the original of the minimum original size detectable (e.g., the A6 size). Accordingly, since the exposure lamp 111*a* has risen to the prescribed state, there is no inconvenience in original size detecting operation.

At the same time, preliminary processing for copy operation is effected by the turn-on of the corona charger 105, the transfer charger 107, the separation charger 108 and the motor for the development unit.

If the scanning request is not issued in step 632, the scanning motor is rotated in the reverse direction in step 635 and processing for returning the optical system 110 is effected. Subsequently, the copy request flag is set (in step 636) so that the apparatus is prepared for the next copy operation.

On the other hand, if YES is determined in the above mentioned step 631, which means that the scanner 131 is returned to the home position, copy operation is started. More specifically, the setting of the copy request flag is confirmed in step 638 and the scanning motor is stopped in step 639. Then, the feed roller is turned on, the timers A and B are set and the copy request flag is reset. Subsequently, the processing flow proceeds to step 606, so that copy operation is successively effected.

Thus, since processing corresponding to the preliminary processing in the above mentioned steps 601 to 604 are already executed in the steps 632 to 639, the processing flow immediately proceeds to step 607. Thus, the time required for the copy operation is reduced.

According to the above described second embodiment, the original length can be detected by the photosensor 151 and even if it is determined temporarily that no original exists during detection of the original size due to change in the intensity of light dependent on the pattern or density of the original, such erroneous determination is disregarded and the position where absence of the original is detected finally is determined to be the rear edge position of the original. Accordingly, a shorter length than the actual original length is not detected erroneously and a correct original size is detected.

In addition, since the exposure lamp 111*a* can be turned on with a delay from the start of scanning of the scanner 131, it is not needed to wait for the rise time of the exposure lamp 111*a* when the scanner 131 starts to move. Thus, the first copy speed is increased accordingly.

In copy operation, since the exposure lamp 111*a* is in the off state during the scanning of the leading edge portion of the original, which was irradiated and liable to be heated excessively in the prior art, increase of the temperature on the platen glass can be suppressed.

In the above described embodiment, the photosensor 151 is provided near the length 114 to receive the light reflected from the original D irradiated by the exposure lamp 111*a* and to scan the original in the longitudinal direction according to the movement of the scanner 131 having the exposure lamp 111*a*. However, the photosensor 151 may be provided on the side of the scanner 131. The photosensor 151 may be driven by other drive means than the scanner 131. The scanner 131, the photosensor 151 and the like may be fixed so that the platen glass 116 together with the original D may move.

In the above described embodiment, the first and second timers for detecting the original size, the original size detecting means and the irradiation control means are implemented by means of software using the programs in the CPU 301. However, they may be implemented by hard logics and the like.

In the above described embodiment, the second timer starts counting based on the on timing of the original edge switch 150 in order to delay the turn-on of the exposure lamp 111*a*. However, the second timer may start counting simultaneously with the start of movement of the scanner 131.

According to the above described embodiment of the invention, the original size can be detected correctly and the time of turn-on of the light source during original size detecting operation can be effectively reduced. As a result, it becomes possible to suppress increase of the temperature on the platen glass and to reduce consumption of power.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. An original size detecting apparatus comprising:

a platen on which an original is placed, irradiating means for irradiating said platen on which the original is placed, detecting means for receiving light reflected from said platen irradiated by said irradiating means and detecting a rear edge of the original, executing means for executing a relative movement between said platen and said detecting means, moving amount measuring means for measuring an amount of said relative movement, storing means for storing the relative movement amount measured by said moving amount measuring means, in response to a detection output of said detecting means, determining means for determining a size of the original on said platen, based on the relative movement amount stored in said storing means, and control means for controlling said irradiating means so as to start irradiation after a start of said relative movement.

2. An original size detecting apparatus in accordance with claim 1, wherein said control means controls said irradiating means so as to start irradiation before said measuring means measures the relative movement amount corresponding to the minimum original size of the original placed on said platen.

3. An original size detecting apparatus in accordance with claim 1, wherein said control means controls said irradiation means so as to start irradiation after an elapse of a predetermined time from the start of the relative movement by said executing means.

4. An original size detecting apparatus in accordance with claim 1, wherein said irradiating means includes an exposure lamp and starts irradiation when said exposure lamp turns on.

5. An original size detecting apparatus in accordance with claim 4, wherein said exposure lamp attains a prescribed amount of irradiation after an elapse of a prescribed time after the turn-on of said exposure lamp.

6. An original size detecting apparatus in accordance with claim 5, wherein said exposure lamp attains said prescribed amount of irradiation before said exposure lamp irradiates a rear edge of a minimum original by said relative movement.

7. An original size detecting apparatus used in an image forming apparatus comprising:

a platen on which an original is placed;

irradiating means for irradiating said platen on which the original is placed, said irradiating means having an exposure lamp which has a length corresponding to a width of said platen;

executing means for executing a relative movement between said platen and said exposure lamp;

detecting means for receiving light reflected from said platen irradiated by said irradiating means and detecting a rear edge of the original;

moving amount measuring means for measuring an amount of said relative movement;

determining means for determining a size of the original on said platen, based on the relative movement amount; and control means for controlling said exposure lamp of said irradiating means so as to start irradiation simultaneously with a start of said relative movement, wherein said exposure lamp starts irradiation when turned on and attains a prescribed amount of irradiation after an elapse of a prescribed time after the exposure lamp is turned on.

8. An original size detecting apparatus in accordance with claim 7, wherein said exposure lamp attains said prescribed amount of irradiation before said exposure lamp irradiates a rear edge of a minimum original by said relative movement.

9. An original size detecting apparatus comprising:

a platen on which an original is placed, irradiating means for irradiating said platen on which the original is placed, detecting means for receiving light reflected from said platen irradiated by said irradiating means and detecting an intensity of the received reflected light, executing means for executing a relative movement between said platen and said detecting means, moving amount measuring means for measuring an amount of said relative movement, reference level detecting means for detecting coincidence between a detection output of said detecting means and a reference level, storing means for storing the relative movement amount measured by said moving amount measuring means, in response to a detection output of said reference level detecting means, determining means for determining a size of the original, after an end of said relative movement, based on the relative movement amount stored last in said storing means, and control means for controlling said irradiating means so as to start irradiation after a start of said relative movement.

10. An original size detecting apparatus in accordance with claim 9, wherein said irradiating means includes an exposure lamp and attains a prescribed amount of irradiation after an elapse of a prescribed time after turn-on of said exposure lamp.

11. An original size detecting apparatus in accordance with claim 10, wherein said detecting means detects an intensity of reflected light based on the irradiation of said exposure lamp with said prescribed amount of irradiation.

12. An original size detecting apparatus comprising:

a platen on which an original is placed;

irradiating means for irradiating said platen on which the original is placed, said irradiating means having an exposure lamp which has a length corresponding to a width of said platen;

executing means for executing a relative movement between said platen and said exposure lamp;

detecting means for receiving light reflected from said platen irradiated by said irradiating means and detecting an intensity of the received reflected light;

moving amount measuring means for measuring an amount of said relative movement;

reference level detecting means for detecting coincidence between a detection output of said detecting means and a reference level;

storing means for storing the amount of relative movement measured by said moving amount measuring means, in response to a detection output of said reference level detecting means;

determining means for determining a size of the original, after an end of said relative movement, based on the relative movement amount stored last in said storing means; and control means for controlling said exposure lamp of said irradiating means so as to start irradiation simultaneously with the start of said relative movement, wherein said exposure lamp attains a prescribed amount of irradiation after an elapse of the prescribed time after said exposure lamp is turned on.

13. An original size detecting apparatus in accordance with claim 12, wherein said detecting means detects an intensity of reflected light based on the irradiation of said exposure lamp with said prescribed amount of irradiation.

14. An original size detecting apparatus comprising:

a platen on which an original is placed, irradiation instruction means for instructing a start of irradiation, irradiating means having a length corresponding to a width of said platen for starting to irradiate said platen on which the original is placed, in response to an instruction output of said irradiation instructing means and attaining a prescribed amount of irradiation after an elapse of a prescribed time, detecting means for receiving light reflected from said platen irradiated by said irradiating means with said prescribed amount of irradiation and detecting a change in intensity of the received light, executing means for executing a relative movement between said platen and said detecting means at a timing equal to or before the start of irradiation, moving amount measuring means for measuring an amount of said relative movement, and determining means for determining a size of the original on said platen, based on a detection output of said detecting means and a measurement output of said moving amount measuring means.

15. An original size detecting apparatus in accordance with claim 14, wherein said predetermined time is determined by the minimum dimensions of the original placed on said platen.

16. An original size detecting apparatus in accordance with claim 14, wherein the change in the intensity of the light corresponding to the original on said platen is a change in intensity of reflected light appearing when said irradiation means irradiates said platen across the rear edge of the original on said platen.

17. An original size detecting apparatus comprising:

a platen on which an original is placed;

irradiating means for irradiating said platen on which the original is placed;

executing means for executing a relative movement between said platen and said irradiating means;

detecting means for receiving light reflected from said platen during said relative movement and detecting a rear edge of the original;

moving amount measuring means for measuring an amount of said relative movement;

determining means for determining a size of the original on said platen based on the relative movement amount when said detecting means detects the rear edge of the original; and control means for controlling said irradiating means so as to start irradiation after start of said relative movement.

18. In an apparatus having a lamp for irradiating an original placed on a platen, an original size detecting method comprising the steps of:

starting a relative movement between the lamp and the platen;

starting the irradiation of said lamp after the step of starting the relative movement;

measuring an amount of said relative movement;

receiving light reflected from said paten during said relative movement so as to detect a rear edge of the original; and determining a size of the original on said platen based on the relative movement amount when the rear edge of the original is detected.

* * * * *